US012639194B2

(12) United States Patent
Lemberg et al.

(10) Patent No.: US 12,639,194 B2
(45) Date of Patent: May 26, 2026

(54) COMPUTER APPLICATION ERROR ROOT CAUSE DIAGNOSTIC TOOL

(71) Applicant: Microsoft Technology Licensing, LLC, Redmond, WA (US)

(72) Inventors: Rachel Lemberg, Herzliya (IL); Piyush Gupta, Sammamish, WA (US); Akshay Ranjan Chaurasia, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 18/070,333

(22) Filed: Nov. 28, 2022

(65) Prior Publication Data

US 2024/0176726 A1     May 30, 2024

(51) Int. Cl.
*G06F 11/362* (2025.01)
*G06F 11/3698* (2025.01)

(52) U.S. Cl.
CPC ........ *G06F 11/3636* (2013.01); *G06F 11/366* (2013.01); *G06F 11/3698* (2025.01)

(58) Field of Classification Search
None
See application file for complete search history.

(56) References Cited

U.S. PATENT DOCUMENTS

| | | | |
|---|---|---|---|
| 7,900,201 B1 * | 3/2011 | Qureshi | ................. G06N 5/048 717/124 |
| 9,086,060 B1 | 7/2015 | Stickelmaier et al. | |

| | | | |
|---|---|---|---|
| 10,581,596 B2 | 3/2020 | Schmisseur et al. | |
| 10,761,921 B2 | 9/2020 | Cheriton | |
| 10,949,285 B2 | 3/2021 | Cheriton | |
| 11,126,731 B1 | 9/2021 | Thomas et al. | |

(Continued)

FOREIGN PATENT DOCUMENTS

| | | |
|---|---|---|
| CN | 108197344 A | 6/2018 |
| CN | 110488154 A | 11/2019 |

OTHER PUBLICATIONS

Shah, et al., "Root Cause Analysis for Hadoop Applications", Retrieved from: https://blog.developer.bazaarvoice.com/2019/08/07/root-cause-analysis-for-hadoop-applications/, Aug. 7, 2019, 13 Pages.

(Continued)

*Primary Examiner* — Andrew M. Lyons
(74) *Attorney, Agent, or Firm* — Holzer Patel Drennan

(57) ABSTRACT

Technology is disclosed for diagnosing and mitigating errors in computer applications. One implementation facilitates determining a root cause of an error affecting a computer application. A root cause of a computer application error is efficiently determined using a set of fault profiles associated with the computer application. A fault profile includes information regarding a particular fault, such as a failing computer resource, which may be the root cause of another error or condition that is detected during the operation of the computer application. A fault profile can also include telemetry data that typically occurs on the computer system in connection with the particular root cause fault. Upon detecting an error, telemetry data from the time of the error is compared against the set of fault profiles, and a fault profile that is similar is determined. Based on the similar fault profile, the root cause of the error is determined.

20 Claims, 6 Drawing Sheets

300

OPERATE A COMPUTER APPLICATION ON A COMPUTER SYSTEM ACCORDING TO A FIRST CONDITION OF OPERATION —310

MONITOR THE COMPUTER SYSTEM DURING THE OPERATION TO DETERMINE A FIRST-CONDITION TELEMETRY DATA SET —320

OPERATE THE COMPUTER APPLICATION ON THE COMPUTER SYSTEM ACCORDING TO A SECOND CONDITION OF OPERATION —330

CAUSE A FIRST FAULT ASSOCIATED WITH THE OPERATION OF THE COMPUTER APPLICATION —340

MONITOR THE COMPUTER SYSTEM DURING THE OPERATION TO DETERMINE A SECOND-CONDITION TELEMETRY DATA SET —350

BASED ON A COMPARISON OF THE FIRST-CONDITION TELEMETRY DATA SET AND THE SECOND-CONDITION TELEMETRY DATA SET, DETERMINE AT A FAULT FEATURE —360

GENERATE A FIRST FAULT PROFILE THAT IS A DATA STRUCTURE THAT COMPRISES AN INDICATION OF THE FIRST FAULT AND AN INDICATION OF THE FAULT FEATURE —370

(56) References Cited

U.S. PATENT DOCUMENTS

| | | | |
|---|---|---|---|
| 2020/0379871 A1* | 12/2020 | Prakash | G06F 11/0784 |
| 2021/0223982 A1 | 7/2021 | Prado et al. | |
| 2021/0406140 A1* | 12/2021 | Sethi | H04L 41/147 |
| 2022/0012149 A1 | 1/2022 | Doshi et al. | |
| 2022/0147409 A1 | 5/2022 | Linck | |

OTHER PUBLICATIONS

International Search Report and Written Opinion received for PCT Application No. PCT/US2023/036632, Mar. 5, 2024, 12 pages.
International Preliminary Report Patentability received for PCT Application No. PCT/US23/036632, Jun. 5, 2025, 07 pages.

* cited by examiner

300

```
┌─────────────────────────────────────────────────────────────┐
│  OPERATE A COMPUTER APPLICATION ON A COMPUTER SYSTEM         │
│  ACCORDING TO A FIRST CONDITION OF OPERATION                │ ～ 310
└─────────────────────────────────────────────────────────────┘
                              │
                              ▼
┌─────────────────────────────────────────────────────────────┐
│  MONITOR THE COMPUTER SYSTEM DURING THE OPERATION           │
│  TO DETERMINE A FIRST-CONDITION TELEMETRY DATA SET          │ ～ 320
└─────────────────────────────────────────────────────────────┘
                              │
                              ▼
┌─────────────────────────────────────────────────────────────┐
│  OPERATE THE COMPUTER APPLICATION ON THE COMPUTER           │
│  SYSTEM ACCORDING TO A SECOND CONDITION OF OPERATION        │ ～ 330
└─────────────────────────────────────────────────────────────┘
                              │
                              ▼
┌─────────────────────────────────────────────────────────────┐
│  CAUSE A FIRST FAULT ASSOCIATED WITH THE OPERATION OF       │
│  THE COMPUTER APPLICATION                                    │ ～ 340
└─────────────────────────────────────────────────────────────┘
                              │
                              ▼
┌─────────────────────────────────────────────────────────────┐
│  MONITOR THE COMPUTER SYSTEM DURING THE OPERATION TO        │
│  DETERMINE A SECOND-CONDITION TELEMETRY DATA SET            │ ～ 350
└─────────────────────────────────────────────────────────────┘
                              │
                              ▼
┌─────────────────────────────────────────────────────────────┐
│  BASED ON A COMPARISON OF THE FIRST-CONDITION TELEMETRY     │
│  DATA SET AND THE SECOND-CONDITION TELEMETRY DATA SET,      │ ～ 360
│  DETERMINE AT A FAULT FEATURE                               │
└─────────────────────────────────────────────────────────────┘
                              │
                              ▼
┌─────────────────────────────────────────────────────────────┐
│  GENERATE A FIRST FAULT PROFILE THAT IS A DATA STRUCTURE    │
│  THAT COMPRISES AN INDICATION OF THE FIRST FAULT            │ ～ 370
│  AND AN INDICATION OF THE FAULT FEATURE                     │
└─────────────────────────────────────────────────────────────┘
```

*FIG. 3*

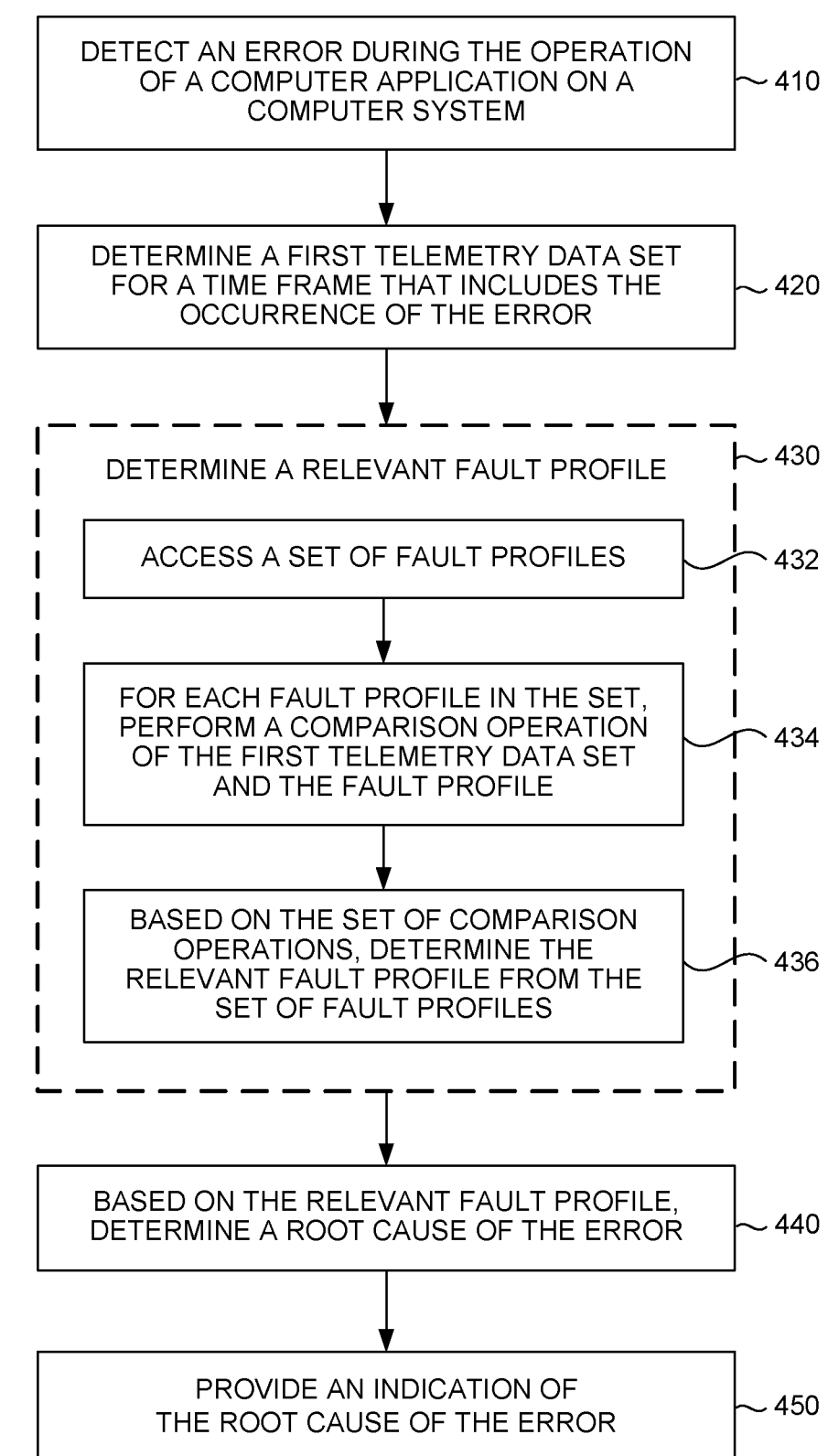

400

DETECT AN ERROR DURING THE OPERATION OF A COMPUTER APPLICATION ON A COMPUTER SYSTEM ~ 410

DETERMINE A FIRST TELEMETRY DATA SET FOR A TIME FRAME THAT INCLUDES THE OCCURRENCE OF THE ERROR ~ 420

DETERMINE A RELEVANT FAULT PROFILE ~ 430

ACCESS A SET OF FAULT PROFILES ~ 432

FOR EACH FAULT PROFILE IN THE SET, PERFORM A COMPARISON OPERATION OF THE FIRST TELEMETRY DATA SET AND THE FAULT PROFILE ~ 434

BASED ON THE SET OF COMPARISON OPERATIONS, DETERMINE THE RELEVANT FAULT PROFILE FROM THE SET OF FAULT PROFILES ~ 436

BASED ON THE RELEVANT FAULT PROFILE, DETERMINE A ROOT CAUSE OF THE ERROR ~ 440

PROVIDE AN INDICATION OF THE ROOT CAUSE OF THE ERROR ~ 450

*FIG. 4*

COMPUTER APPLICATION ERROR ROOT CAUSE DIAGNOSTIC TOOL

BACKGROUND

Since the inception of the practice of computer programming, computer software applications have been subject to problems arising from unforeseen circumstances or scenarios that occur during their deployment into production. That is, after a computer application has been developed and deployed in an operational environment (e.g., production), when it is executed by one or more computing devices (e.g., physical computing machines or virtual computing machines), the computer application can exhibit errors or experience a failure. For example, a particular computer resource utilized by the computer application, such as a network component, may gradually or suddenly experience increased traffic, for instance due to its increased usage by a different computer application, and thus become unavailable to the computer application or slower to respond to requests by the computer application. As a result of not having sufficient capacity to meet the needs of the computer application, the computer application may not perform within user expectations.

The operation of modern computing applications may entail utilizing thousands of computer resources. For instance, due to the increased connectivity of physical hardware devices, the various layers and components of many modern applications have been distributed and/or virtualized across multiple distributed devices. An initial problem occurring with any one of these computer resources can impact the operation of the computer application causing other errors or failures. On the other hand, modern computing applications are typically designed to be resilient to problems occurring with computer resources. The term "resiliency" is typically employed to describe a computer application's ability to react to issues in one or more of its computer resources, and still provide the best possible service to its users. Thus, problems occurring with the computer resources may not impact the operational performance of a computer application. Consequently, when a computer application fails or exhibits an error, determining the root cause, such as identifying which particular computer resource is responsible for the error or failure, can be an extremely difficult undertaking.

Diagnosis procedures can be highly complex, especially for large, distributed computer applications. In particular, the analysis and troubleshooting required for attributing the cause of a computer application error is typically performed manually and require significant time, computational resources, and an extensive understanding of the operational state of the computer system on which the computer application is operating, as well as an understanding of the computer application and its design. Moreover, many computer resources are not independent and so issues occurring with one computer resource can cause issues with other computer resources, thus further compounding the challenges of determining causation of error in a computer application. As a result, many computer application errors cannot be effectively or timely diagnosed so that the underlying causations of errors can be identified and addressed. Instead, computer applications may be less resilient than users expect or require.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are generally directed towards improved technologies for diagnosing and mitigating errors in computer applications. In particular, the technology disclosed herein facilitates determining the root cause(s) of errors impacting a computer application, and can do so more efficiently and without requiring the overhead computer resources or laborious procedures of conventional technologies for error detection and attribution. In some embodiments, the root cause(s) of computer application errors are diagnosed or attributed by providing a set of fault profiles associated with the computer application. A fault profile includes information regarding a particular fault, such as a failing computer resource or other failure incident, which may be the root cause of another error or condition that is detected during the operation of the computer application. A fault profile may also include telemetry data, an indication of telemetry data, or information that may be derived from telemetry data, which typically occurs on the computer system in connection with the particular root cause fault. In some embodiments, fault profiles are generated during pre-production development and testing of the computer application and subsequently made available during normal operation, such as operating in a production environment, for diagnosing root causes of errors.

When a computer application is operating, upon detecting an error or fault in the operation of the computer application, a set of telemetry data is collected regarding the operation of the computer application in the operating state. In some embodiments, this operating state telemetry data is compared to the telemetry data, or information that may be derived from telemetry data, in the set of fault profiles associated with the computer application. A relevant fault profile, such as the closest matching profile, may be determined based on the comparison. From the relevant fault profile, information regarding the particular fault or error, such as a particular failed computer resource, is then utilized to determine a root cause of the error or fault that is detected in the operation of the computer application. In some instances, information of the relevant fault profile specifies logic or computer instructions for performing diagnostic testing, such as by a computer diagnostic service, to further determine a root cause of the error and/or to mitigate the error.

According to an embodiment, a computer application is operated on a computer system in a testing environment. The testing environment computer system includes various computer resources that are utilized by the computer application or by the computer system. Aspects of the testing environment are controlled according to various testing conditions, such as the state of particular computer resources and/or other computer applications that are operating on the computer system of the testing environment.

The computer application is operated in the testing environment under typical or ideal conditions, which may be specified according to the testing conditions. As the computer application is operating on a computer system of the testing environment under these conditions, a set of telemetry data of the computer system is recorded over a window of time that includes the operation of the computer application. This telemetry data reflects the state of the computer system during a normal or ideal operation of the computer application.

In addition to operating under typical or ideal conditions, the computer application is also operated in the testing environment where it is subjected to a failure incident, such as one or more faults injected into the computer system or testing environment. As the computer application is operating and subjected to a failure incident, another set of telemetry data regarding the computer system is recorded over a window of time that includes the operation of the computer application. This set of telemetry data represents the operation of the computer system during a fault state. This process can be repeated for different types of failure incidents, with a set of fault state telemetry data recorded for each type of failure incident.

The set of fault state telemetry data, for each session involving a particular failure incident, is then compared against the set of telemetry data acquired during normal or ideal operation. Based on the comparison, a data feature of the telemetry data, or a combination of data features of the telemetry data, are identified that are present in the fault state telemetry data but not present in the telemetry data acquired during normal or ideal operation. These telemetry data features present only in the fault state telemetry data comprise telemetry data features whose presence is correlated with the occurrence of the failure incident, and are referred to herein as "fault features." Accordingly, specific fault features comprise aspects of telemetry data that are indicative of a particular failure incident, and comprise a single feature or a combination of features, which may include a sequence or pattern of features.

A fault profile corresponding to a particular failure incident is generated based on the corresponding fault features and information about the particular failure incident, such as information indicating a particular computer resource that was subjected to failure via a fault injection. Fault profiles may be generated for different types of failure incidents such that a set of fault profiles is generated and associated with the particular computer application operating in the testing environment. The set of fault profiles corresponding to a particular computer application may be stored in a computer data store so as to be accessible to a diagnostic computer service.

The computer application is then placed into an operating environment, such deployed into production. When placed in production, a computer application is operated for its intended use by end users. While operating in the operating environment, upon detecting a failure or error, a set of operating state telemetry data is accessed. The operating state telemetry data is compared against the fault profiles corresponding to the computer application. In particular, operating state telemetry data features are compared against the fault features of the fault profiles so that a relevant or closest matching fault profile is identified. Based on the relevant fault profile, information about the particular failure incident indicated in that fault profile is used to determine a root cause of the failure or error that was detected during operation of the computer application.

In this way, root causes of errors occurring in even large, complex, or distributed computer applications can be efficiently determined and mitigated so that the computer applications are made more resilient. Further and advantageously, root causes of errors can be determined more accurately and mitigated efficiently without requiring the amount of computer resources needed to support conventional computer diagnostics services. Further still, embodiments of these technologies reduce the need for manual analysis and troubleshooting by technicians having extensive understanding of the operational state of the computer system on which the computer application is operating, as well as an understanding of the computer application and its design.

BRIEF DESCRIPTION OF THE DRAWINGS

Aspects of the disclosure are described in detail below with reference to the attached drawing figures, wherein:

FIGS. 3 and 4 depict flow diagrams of example methods for determining the root cause of a computer application error, in accordance with an embodiment of the present disclosure;

DETAILED DESCRIPTION

Figure 1:
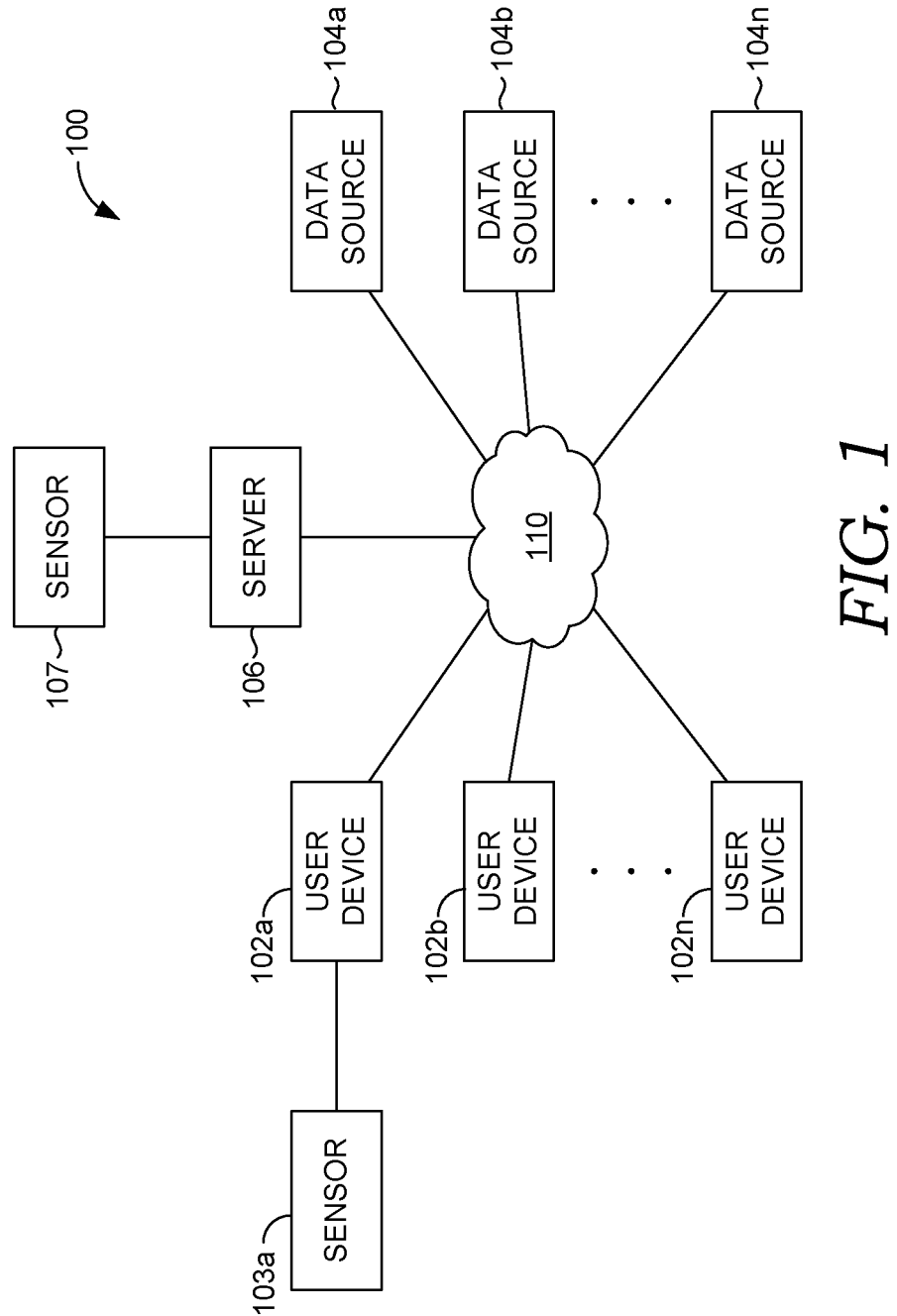
FIG. 1 is a block diagram of an example computing environment suitable for implementing an embodiment of the present disclosure.

Aspects of the present disclosure relate to technology for improving the operation of computer applications including improved and programmatic error detection, testing, debugging, and increasing resiliency of computer applications. In particular, the embodiments described herein are generally directed towards improved technologies for diagnosing and mitigating errors in computer applications. These technologies can facilitate determining the root cause(s) of errors affecting a computer application, and can do so more efficiently and without requiring the overhead computer resources or laborious procedures of conventional technologies for error detection and attribution.

As further explained herein, a computer application typically comprises a computer software package that performs a specific function (e.g., for an end user or for another computer application). Although the term software is used here, a computer application may be embodied using software, hardware, or a combination thereof. A computer application comprises one or more computer programs, services, or routines that are executed by a computer processor to perform computing operations that run the computer application. Some computer applications operate on a computer system that functions as a client computing device, a server, or a distributed computer system. In particular, a computer application may be layered, distributed, and/or virtualized. That is, various components of the computer application may comprise virtualized components and/or be distributed across multiple remote hardware devices.

As used herein the terms "virtual" and "virtualized," as in virtualized component, virtual machine, virtual network, virtual processor, virtual storage systems, for example, are terms of the art and refer to a computer component such as a machine, network, storage system, computer, processor, or the like, that is created using software on a physical computer (or a physical distributed computing system) in order to emulate the functionality of another, separate physical computer component, such as a machine, network, storage system, computer, processor, or the like. Thus, the emulated physical component is referred to as a virtual component.

According to various embodiments of this disclosure, the root cause(s) of computer application errors can be diagnosed or attributed by providing a set of fault profiles associated with the computer application. A fault profile includes information regarding a particular fault, such as a failing computer resource or other failure incident, which may be the root cause of another error or condition that is detected during the operation of the computer application. A fault profile may also include telemetry data an indication of telemetry data (such as a reference or pointer to telemetry data), or information that may be derived from telemetry data, that typically occurs on the computer system in connection with the particular root cause fault. As used herein, telemetry data comprises one or more metrics, events, activity logs, traces, or other similar data regarding the state of the computer system or network, such as the use or performance of applications or application components, and may include information regarding computer applications operating thereon. In some instances, the telemetry data comprises timestamped or time-associated data regarding particular events, metrics, activity logs, and other telemetry data features, and may further comprise a sequence, burst, trajectory, or pattern of events, a metric or activity data with respect to time.

Fault profiles may be generated during pre-production or out-of-production development and testing of the computer application and subsequently made available during production for diagnosing root causes of errors. For example, in one embodiment, a fault profile comprises an indication of particular telemetry data that is captured during the operation of the computer application while a particular fault occurs, such as the occurrence of a particular failure incident, and may exclude telemetry data that is also present during the operation of the computer application where that particular fault is not present. In this way, the particular telemetry data of the fault profile is correlated with the occurrence of the fault, and thus may be considered indicative of the fault.

Once a computer application is released (or re-released) and operating in an operating environment, upon detecting an error in the operation of the computer application, a set of operating state telemetry data is accessed. The operating state telemetry data comprises telemetry data collected during the operation of the computer application in an operating environment, such as a production environment. In some embodiments, as the computer application operates in the operating environment, operating state telemetry data is recorded continuously, periodically, or as needed. For example, in one embodiment, telemetry data is collected as needed such as upon the detection of an error, or upon a first instance, or first several instances, of operating the computer application in a production environment. In some embodiments, telemetry data is always recorded as the computer application is operating. Aspects of the acquired operating state telemetry data canbe compared to the telemetry data, or information that may be derived from telemetry data, in the set of fault profiles corresponding to the computer application. Based at least in part on the comparison, a relevant fault profile may be determined. For example, in one embodiment, the comparison comprises a similarity comparison such that the relevant fault profile is determined to be the closest matching fault profile. In some embodiments, logic comprising rules or conditions is utilized to determine a relevant fault profile. From the relevant fault profile, information in the profile about the particular fault, such as a particular failed computer resource or other failure incident, is utilized to determine a root cause of the error that is detected in the operation of the computer application. In some instances, information from the relevant fault profile specifies logic or computer instructions for performing diagnostic testing, by a computer diagnostic service, to determine the root cause of the error and/or for mitigating the error.

At a high level and according to an embodiment, a computer application, which may be in pre-production, is operated on a computer system in a testing environment. The testing environment, or more specifically, the computer system operating in the testing environment, may include various computer resources that are utilized by the computer application or by the computer system. The term computer resource is used broadly herein to referto a computer system resource, which may be any physical or virtual resource of limited availability within a computer system. By way of example, computer resources may include connected devices, internal system components, files, network connections, memory areas, endpoints, computing services, and dependencies, any of which may be physical or virtual. A computer resource also may comprise a component of a computer application, such as a function that is called, a linked object or program, or a computer library utilized by the computer application. The computer resources also may comprise a combination of virtual and physical computer resources.

The testing environment computer system may be physical, virtual, or a combination thereof. For example, in one embodiment, the testing environment computer system comprises one or more virtual machines that operate within the testing environment. The computer application operating in the testing environment may be in pre-production or may be taken out of production (or at least a particular instance of the computer application to be operated in the testing environment is not operating in production). For example, in some instances, a computer application that has already been released undergoes evaluation in a testing environment for determining possible updates to the computer application or to facilitate error diagnostic tools such as generating fault profiles. In some instances, a computer application that already has fault profiles that were determined in a pre-production testing environment may be brought back into the testing environment in order to generate additional fault profiles. The new fault profiles may correspond to different errors or contain different telemetry related data than the previous fault profiles.

Aspects of the testing environment may be controlled according to various testing conditions that specify characteristics of the testing environment computer system on which the computer application operates, such as the status of computer resources and/or other computer applications that are operating on the computer system of the testing environment. For example, a particular testing condition may specify the configuration of the environment, which may include the configuration(s) of various computer resources of the environment, such as whether a particular computer resource is available or unavailable or has reduced availability at various times during the operation of the computer application. The computer application is operated in the testing environment under typical conditions and/or ideal conditions, which may be specified according to the testing conditions. Here the term ideal is used to indicate that errors or faults are not known to be present in the testing environment. For example, under ideal conditions, the computer application is always provided the computer resources it needs and/or the components of the computer system of the testing environment may operate without error or unexpected latency. In contrast, under typical conditions, the computer application encounters a normal availability of computer resources. Accordingly, computer resources may be unavailable at times, as would occur during a typical operation of a computer system.

As the computer application is operating on a computer system of the testing environment under these typical or ideal conditions, a set of telemetry data regarding the computer system is recorded over a window of time that includes the operation of the computer application. This telemetry data reflects the state of the computer system during a normal (or ideal) operation of the computer application. In some instances, multiple testing sessions of operating the computer application and recording telemetry data are performed. With each testing session, the computer application is operated on a computer system of the testing environment under typical or ideal conditions, and a set of telemetry data regarding the computer system is recorded over a window of time that includes the operation of the computer application during the session. In this manner, each session can yield a set of normal-operation telemetry data thereby forming a plurality of sets of normal-operation telemetry data. It is contemplated that, in some instances, various differences in the telemetry data may be present across these sets of normal-operational telemetry data. These differences may be due to various changes, differences, or contexts present in the state of the computer system or testing environment from one session to another. But generally, these sets of normal-operation telemetry data represent aspects of the state of the computer system or testing environment during an expected, normal operation of the computer application. In some embodiments, at least a portion of the plurality of sets of normal-operation telemetry data are compared against each other so that outliers, such as particular telemetry data features present in only some of these sets can be removed. In some embodiments, telemetry data features observed in every testing session, or nearly every testing session, are retained in the telemetry data set. In this way, a set of normal-operation telemetry data can be generated that comprises telemetry data features that are likely to be present in every instance or session of normal (or ideal) operation.

In addition to operating under typical or ideal conditions, the computer application is also operated in a testing environment where it is subjected to a failure incident, such as the introduction of one or more faults into the computer system or testing environment. For example, testing conditions may specify that an initial fault (referred to herein as a fault origin) is to occur, such as a particular computer resource failing or becoming unavailable for at least a portion of time during the testing window. In some instances, a failure incident may lead to other errors occurring regarding the operation of the computer application, which may include degraded performance. In those instances, the failure incident is considered to be a root cause of the other errors resulting from the failure incident.

As the computer application is operating and subjected to a failure incident, another set of telemetry data regarding the computer system is recorded over a window of time that includes the operation of the computer application. This set of telemetry data represents the operation of the computer system during a failure or fault state, and is referred to herein as fault state telemetry data. In some embodiments, the telemetry data is recorded before, during, and/or after a failure incident. This process can be repeated for different failure incidents, with a set of fault state telemetry data recorded for each type of failure incident. In some instances, multiple testing sessions of operating the computer application and recording telemetry data may be performed for the same type of failure incident, so that a plurality of sets of telemetry data are captured that correspond to a particular failure incident. The plurality of sets of telemetry data for the same fault origin may be compared so that outliers, such as particular telemetry data features present in only some of the sets is filtered out. The telemetry data features observed in every testing session, or nearly every testing session, are retained in the telemetry data set, in some embodiments. In this way, a set of fault state telemetry data can be generated that comprises telemetry data features that are more likely to be present in every instance of the failure incident.

Further, in some embodiments, the fault state telemetry data also includes information regarding the failure incident or fault origin. In particular, it is contemplated that in some instances, testing conditions may specify a particular failure incident, such as injecting a particular fault, but the actual result of the fault injection operation may be different than what was specified. For example, testing conditions may specify causing a particular component to experience a fifty percent increase in latency. But due to other circumstances in the testing environment, such as the operation of other applications, the component actually may experience a greater or lesser latency than a fifty percent increase. Accordingly, telemetry data may be recorded and used to determine an actual testing condition applied to the testing environment, based on a specified testing condition. Additionally or alternatively, in some embodiments, the recorded fault state telemetry data is used to confirm that a particular failure incident occurred as specified according to a specified testing condition. In some embodiments, where the actual testing condition is different than a specified testing condition, the actual testing condition is considered the fault origin and/or associated with the fault state telemetry data for use to generate a fault profile, as described herein.

In some embodiments, at least some testing conditions are determined based on chaos testing and/or breaking tests. Chaos testing (sometimes referred to as chaos engineering) comprises a process for testing resiliency of computer software by subjecting it to various conditions to induce failure or impact the operation of the computer application. For instance, in various embodiments this includes generating targeted failures of computer resources, random outages, bottlenecks, or limitations affecting computer resources or the computer system. Chaos testing may include intentionally simulating and/or providing potentially adverse scenarios (or states) of operation to components of a computer application or computer system. This may include applying perturbation models that intentionally "inject" faults into the components of a computer application or testing environment. Such fault-injections can include component shutdowns and/or failures, the injection of various latencies into the components, the increase (or decrease) of component usage (e.g., component exhaustion), the limiting of component bandwidth, and the like. In some instances, failures are introduced to attempt to break the operation of the computer application, such as causing it to crash. In some instances, failures are introduced to attempt to cause degraded performance of the computer application.

The set of fault state telemetry data, for each testing session involving a particular failure incident, is then compared against a set of telemetry data acquired during normal or ideal operation (e.g., the normal-operation telemetry data). Based on the comparison, a data feature and/or data feature value of telemetry data, or a combination of data features and/or data feature values of telemetry data, are identified that are present in the fault state telemetry data but not present in the normal-operation telemetry data. These telemetry data features present only in the fault state telemetry data comprise "fault features, as described herein. Accordingly, specific fault features comprise aspects of telemetry data indicative of a particular failure incident. In some instances, a fault feature comprises a single data feature or a combination of data features, which may include a sequence or pattern of data features. In some embodiments, a one class support vector machine (SVM) is employed for determining the fault features or for representing fault features in a vectorized form.

A fault profile corresponding to a particular failure incident is generated based on the fault features for the particular failure incident and based on information about the particular failure incident, such as information indicating a particular computer resource that was subjected to failure or other information regarding the particular root cause fault. Fault profiles may be generated for different types of failure incidents such that a set of fault profiles is generated and associated with the particular computer application operating in the testing environment. In some embodiments, a fault profile comprises a data structure (or portion thereof) that includes information about the particular computer application, such as an application ID or version information, information regarding fault features, and information regarding a particular fault, which may be a root cause fault, such as an indication of the failure incident. In some embodiments, the data of a fault profile comprises one or more vectors, such as n-dimensional vectors, mappings, or data constellations. In some embodiments, fault profiles are indexed based on their fault features or corresponding failure incidents. For example, in an embodiment, the indexing is used to facilitate comparison of fault profiles to operating state telemetry data. As further described herein, some embodiments of fault profiles further include or have associated therewith logic or computer instructions to facilitate the detection of particular fault features, to determine the root cause fault, and/or to mitigate the root cause fault, once it is determined. The fault profiles corresponding to a particular computer application may be stored in a computer data store as to be accessible to a diagnostic computer service.

The computer application is then operated in an operating environment; for example, the computer application may be released (or re-released) into production. While operating, upon detecting an error, a set of operating state telemetry data is recorded. In some embodiments, telemetry data is continuously or periodically recorded as a computer application operates, so that the operating state telemetry data includes telemetry data before, during, and after the error incident. Aspects of the operating state telemetry data are compared against the fault profiles corresponding to the computer application. In particular, operating state telemetry data features are compared against the fault features of the fault profiles so that a relevant fault profile is determined. In some embodiments, the relevant fault profile comprises the closest matching fault profile, which is the fault profile that has the greatest number of fault features that are also present in the operating state telemetry data. In some embodiments, the comparison is performed using a diagnostic computer service. In some embodiments, a diagnostic computer service performs additional analysis on the operating state telemetry data, or testing on the operating environment (or the computer system operating within the operating environment) in order to determine that a particular fault profile candidate is relevant to the detected error.

Based on the relevant fault profile, information about the particular failure incident indicated in the fault profile is used to determine a root cause fault of the error that was detected during operation of the computer application in production. For example, in one embodiment, a log file is automatically generated indicating information about the detected error and the potential root cause fault of the detected error, based on the failure incident indicated in the fault profile. Alternatively or in addition, a configuration of computer resources in the operating environment may be automatically adjusted to mitigate the detected error based on the information provided by the fault profile indicating a likely root cause of the detected error. For example, if the root cause is due to a particular computer resource being unavailable and a diagnostic computer service indicates that the particular computer resource is unavailable due to its use by another computer application, then the diagnostic computer service may issue a computer instruction to throttle, reschedule, or terminate the other computer application so that the computer resource becomes available.

Overview of Technical Problems, Technical Solutions, and Technological Improvements As described previously, the operation of modern computer applications may entail utilizing thousands of computer resources, which may include distributed and/or virtualized computing resources. A problem occurring with any one of these computer resources can impact the operation of the computer application leading to errors or failures. At the same time, modern computer applications are also typically designed with some degree of resiliency to withstand some degree of limitation or fault occurring in computer resources. Consequently, when a computer application does fail or exhibits an error, determining the root cause of the failure or error, such as identifying which particular component is responsible for the error or failure, can be an extremely difficult undertaking. Moreover, many computer resources are not independent and so issues occurring with one computer resource can cause other issues with other computer resources, thus further compounding the challenges of determining causation of error in a computer application.

Conventional technologies for diagnosing and debugging or mitigating errors in the operation of a computer application are computer resource intensive and prone to error. Oftentimes troubleshooting is a manual and time-consuming effort requiring specialized computing tools and an extensive understanding of the operational state of the computer system on which the computer application is operating, as well as an understanding of the computer application and its design. The diagnostic procedures also can be highly complex, especially for large, distributed computer applications. Conventional troubleshooting and error mitigation often uses a trial-and-error approach, which can lead to further errors or problems by attempting to fix or change the configuration of computer resources that are not the root cause of the problem. In particular, not knowing the precise, root cause of a particular error may lead to the implementation of technical solutions, such as software patches for the computer application or modifications to the computer system, that do not actually resolve the underlying fault, may negatively impact the performance of the computer application, such as requiring it to operate in a suboptimal state, and/or can cause additional computer errors. Moreover, depending on the error, the particular application exhibiting the error, other computer applications, or the entire computer system may be placed offline or made unavailable for a substantial period of time while diagnostic tests are performed and various fixes evaluated.

The conventional development of computer applications entails testing the computer application in an effort to foresee potential problems and account for the problems in the design of the computer application as it is developed. However, despite this testing and accounting for some anticipated problems, conventional development and debugging technologies for computer applications still suffer from the technical limitations described above. Further, it is nearly impossible to anticipate or account for every problem given the complexity of modern computer systems and computer applications, and in particular, given the number of computer resources involved, and the uncertainty of how other computer applications operating on a computer system will impact the particular computer application being developed. As such, conventional approaches for developing computer applications as well as diagnosing and debugging or mitigating computer application errors, remain deficient. As a result, many computer application errors are unable to be effectively or timely diagnosed so that the underlying causations of errors can be identified and addressed. Instead, users must accept and live with computer applications that are less resilient than what they expect or require.

These and other technical deficiencies of the conventional technology are mitigated by the embodiments of the technology described herein. In particular, among other benefits, embodiments of this disclosure improve the operation of computer applications by providing improved technology for efficiently detecting problems in the computer applications including programmatic error detection and debugging, so that the computer applications are made more resilient. Moreover, embodiments of the technologies described herein improve conventional diagnostic and debugging technology by: reducing the likelihood of subsequent errors caused by misdiagnosis of the root cause fault, decreasing troubleshooting time, reducing or eliminating the need for skilled technicians, and reducing the overhead and computational resources needed for diagnosis and debugging of the computer applications.

Additionally, embodiments of the computing technology for programmatically determining and facilitating mitigation of root causes of errors in the operation of computer applications, as provided from this disclosure, are beneficial for other reasons. For example, not only can some embodiments of this technology improve computer applications and their operation by enabling more efficient and more accurate diagnosis and correction of problems including some problems that would otherwise go unaddressed, but these embodiments can do so automatically. That is, these embodiments do not require laborious procedures performed by a technician using specialized diagnostic technology as necessitated by some of the conventional technologies. Further, some embodiments of this disclosure provide a diagnostic technology that reduces downtime of the computer system or computer application for diagnosis and problem mitigation, as compared to the conventional technology.

Further still, by generating and utilizing the fault profiles based on telemetry data, as described herein, embodiments of these technologies enable root cause detection for a significantly greater number of computer problems than could be practically anticipated by developers during application development. Further still, by generating and utilizing the fault profiles, as described herein, root causes of error occurring in even large, complex, or distributed computer applications can be efficiently determined and mitigated so that the computer applications are made more resilient. Further still, generating and utilizing the fault profiles, as described herein, improves computational efficiency, improves the utilization of computing resources, and saves time for diagnosis and debugging. For example, by eliminating a need to run diagnostic testing on every component of a computer application, some embodiments of these technologies reduce network bandwidth utilized and/or reduce other computational resources needed for diagnosis and debugging. Further still, generating and utilizing the fault profiles, as described herein, can improve the resiliency of computer application operations by enabling root cause faults to be more readily and accurately detected so that they can be mitigated via revised application design or by modifying the configuration of the computer system on which the computer application operates. Further still, by generating and utilizing the fault profiles based on telemetry data, as described herein, embodiments described herein provide an improved technology that is flexible and scalable in that fault profiles can be added or updated (for example, more fault profiles added or existing fault profiles updated) even after a computer application is in production. For instance, fault profiles can be readily added for new types of errors that may not have existed at the time of the initial computer application development. Still other technical advantages and technological improvements are provided from the various descriptions of the embodiments disclosed herein.

Additional Description of the Embodiments

Turning now to FIG. 1, a block diagram is provided showing an example computing environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example computing environment 100 includes a number of user computing devices, such as user devices 102a and 102b through 102n; a number of data sources, such as data sources 104a and 104b through 104n; server 106; sensors 103a and 107; and network 110. It should be understood that computing environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include one or more local area networks (LANs) and/or wide area networks (WANs). In some implementations, network 110 comprises the Internet and/or a cellular network, amongst any of a variety of possible public and/or private networks.

It should be understood that any number of user devices, servers, and data sources may be employed within computing environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of computing environment 100, while server 106 can be on the server-side of computing environment 100. Server 106 can comprise server-side software designed to work in conjunction with client-side software on user devices 102a and 102b through 102n so as to implement any combination of the features and functionalities discussed in the present disclosure. This division of computing environment 100 is provided to illustrate one example of a suitable environment, and there is no requirement for each implementation that any combination of server 106 and user devices 102a and 102b through 102n remain as separate entities.

User devices 102a and 102b through 102n comprise any type of computing device capable of use by a user. For example, in one embodiment, user devices 102a through 102n are the type of computing device described in relation to FIG. 5 herein. By way of example, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GP S) or device, a video player, a handheld communications device, a gaming device or system, an entertainment system, a vehicle computer system, an embedded system controller, a camera, a remote control, an appliance, a consumer electronic device, a workstation, any other suitable computing device, or any combination of these delineated devices.

Data sources 104a and 104b through 104n may comprise data sources and/or data systems, which are configured to make data available to any of the various constituents of computing environment 100 or system 200 described in connection to FIG. 2. For instance, in one embodiment, one or more data sources 104a through 104n provide (or make available for accessing), to system 200 of FIG. 2, data from a computer resource, such as a physical or virtual component of the computer system, data about a component of a computer application, and/or other data about the computer system, which may include data about another application operating on the computer system. In one embodiment, data sources 104a through 104n provide telemetry data about a computer system or computing environment such as example computing environment 100. Data sources 104a and 104b through 104n may be discrete from user devices 102a and 102b through 102n and server 106 or may be incorporated and/or integrated into at least one of those components. In one embodiment, one or more of data sources 104a through 104n include one or more sensors, such as sensors 103a and 107, which may be integrated into or associated with one or more of the user device(s) such as 102a, or server 106.

Figure 2:
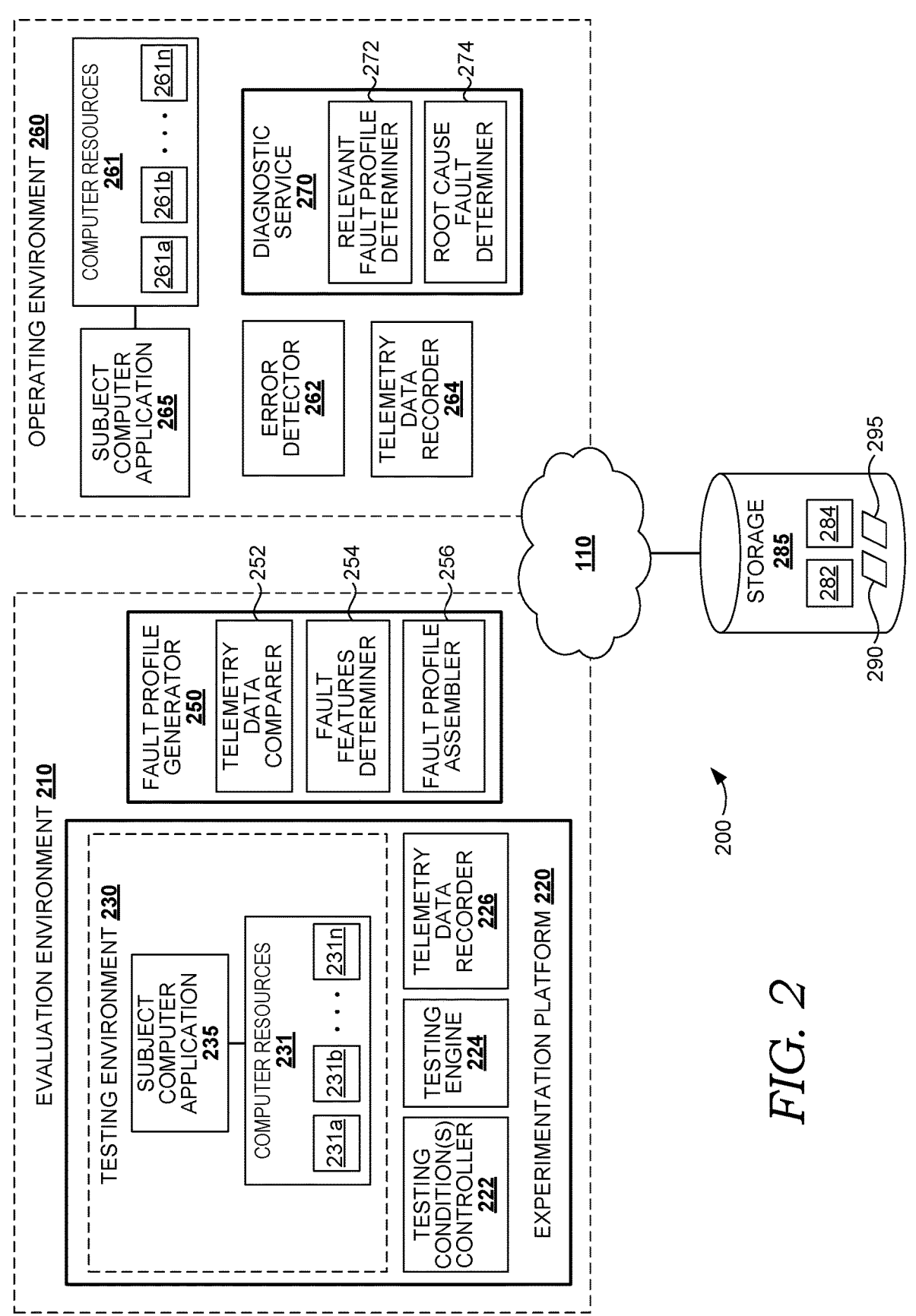
FIG. 2 is a diagram depicting an example computing architecture suitable for implementing an embodiment of the present disclosure.

Computing environment 100 can be utilized to implement one or more of the components of system 200, described in FIG. 2, and can also be utilized for implementing aspects of methods 300 and 400 in FIGS. 3 and 4, respectively. Referring now to FIG. 2, with continuing reference to FIG.

1, a block diagram is provided showing aspects of an example computing system architecture suitable for implementing an embodiment of this disclosure and designated generally as system 200. System 200 represents only one example of a suitable computing system architecture. Other arrangements and elements can be used in addition to or instead of those shown, and some elements may be omitted altogether for the sake of clarity. Further, as with computing environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200, including storage 285 and various components shown as operating in or associated with computing environments including an evaluation environment 210 and an operating environment 260. In particular and as shown in example system 200, components operating in or associated with the evaluation environment 210 include experimentation platform 220 and fault profile generator 250. Components shown as operating in or associated with operating environment 260 include subject computer application 265, computer resources 261, error detector 262, telemetry data recorder 264, and diagnostic service 270. Experimentation platform 220 (including subcomponents 222, 224, 226, 230, and 235), fault profile generator 250 (including its subcomponents 252, 254, and 256), subject computer application 265, error detector 262, telemetry data recorder 264, and diagnostic service 270 (including its subcomponents 272 and 274) may be embodied as a set of compiled computer instructions or functions, program modules, computer software services, or an arrangement of processes carried out on one or more computer systems, such as computing device 500, described in connection to FIG. 5 or cloud computing platform 610, described in connection to FIG. 6, for example.

In one embodiment, the functions performed or supported by components of system 200 are associated with one or more computer applications, services, or routines, such as an application development platform, software debugging application, or computer application diagnostic tool. The functions may operate to facilitate the provision of error diagnosis or debugging for a subject computer application, or improving resiliency of a subject computer application, as described herein. In particular, such applications, services, or routines may operate on one or more user devices (such as user device 102a) or servers (such as server 106). Moreover, in some embodiments, these components of system 200 are distributed across a network, including one or more servers (such as server 106) and/or client devices (such as user device 102a), in the cloud, such as described in connection with FIG. 6, or may reside on a user device, such as user device 102a. Moreover, these components, functions performed by these components, or services carried out by these components may be implemented at appropriate abstraction layer(s) such as the operating system layer, application layer, hardware layer, etc., of the computer system(s). Alternatively, or in addition, the functionality of these components and/or the embodiments described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Additionally, although functionality is described herein with regard to specific components shown in example system 200, it is contemplated that in some embodiments, functionality of these components can be shared or distributed across other components.

Continuing with FIG. 2, evaluation environment 210 and operating environment 260 each comprise a computing environment. In some implementations, operating environment 260 comprises a production environment, and evaluation environment 210 comprises a non-production environment respectively, in regards to the computing environments of subject computer applications 235 and 265. In particular, a production environment, which is sometimes referred to as a deployed environment, comprises a computing environment wherein a computer application, such as subject computer application 265, is considered user-ready and is thus deployed and executed for its intended purpose. In contrast, a non-production environment comprises any environment of a software development life cycle except a production environment, such as analysis and design, development, build, or testing environment, or a combination thereof. Accordingly, in some embodiments, a computer application operating in the evaluation environment 210, such as a subject computer application 235, may be considered under development or under a state of testing, debugging, or refinement. The computing environments of evaluation environment 210 and operating environment 260 comprise one or more computer systems that may include a computing device, such as computing device 500, described in connection to FIG. 5, a cloud computing system, such as cloud computing platform 610, described in connection to FIG. 6, or a similar computing environment such as described in connection with computing environment 100 of FIG. 1, for example.

The example evaluation environment 210 of system 200 includes experimentation platform 220, which is generally responsible for supporting one or more testing environments for computer software, such as testing environment 230. In particular, embodiments of experimentation platform 220 may be used in computer software development, and can include or support various components to facilitate the testing and evaluation of a computer application in development. For example, experimentation platform 220 can be used to expose a computer application to various testing conditions, such as subject computer application 235, which may be in development and testing prior to deployment in production. Some embodiments of experimentation platform 220 support chaos testing or chaos engineering, which is a process of deliberately introducing faults, into the operating environment of a computer application under testing, that simulate real-world outages. In some embodiments, experimentation platform 220 comprises, or is associated with, a software development application or toolkit, such as Visual Studio® or Azure Chaos Studio™, both by Microsoft Corporation®.

Example experimentation platform 220 includes testing environment 230, testing condition(s) controller 222, testing engine 224, and telemetry data recorder 226. Testing environment 230 is generally responsible for providing an operational environment for a computer application under testing and evaluation, such as a subject computer application 235. Embodiments of a testing environment 230 comprise a computer system, such as computing device 500 described in connection to FIG. 5 or cloud computing platform 610 described in connection to FIG. 6, on which the subject computer application operates. In some embodiments, a testing environment 230 computer system comprises multiple computing devices operating in a testing environment. The computer system of testing environment 230 may be a physical or virtual computer system, or may comprise a combination thereof, such as by having one or more physical and virtual components of the computer system. Some implementations of experimentation platform 220 may include multiple testing environments 230.

Embodiments of testing environment 230 may be supported and controlled by experimentation platform 220 for purposes of evaluating a computer application undergoing testing, such as a subject computer application 235. For example and as further explained herein, experimentation platform 220, or one or more of its subcomponents, may facilitate exposing a subject computer application 235 to various testing conditions, such as a fault injection, and observing the response of the subject computer application 235 and/or the testing environment 230 computer system on which the subject computer application 235 operates.

Testing environment 230 includes subject computer application 235 and computer resources 231. Subject computer application 235 operates on a testing environment 230 computer system and may utilize one or more computer resources 231 in its operation. In particular, subject computer application 235 comprises a computer application that is being evaluated in the testing environment 230. For example, a subject computer application 235 that is under development may be evaluated in a testing environment 230 prior to being released into production. Similarly, a subject computer application 235 that is already operating in production and experiencing an error may be operated in testing environment 230 for purposes of evaluating the error and then modifying the design of the subject computer application 235 or the configuration of computing systems on which it operates in order to mitigate the error. As subject computer application 235 is operating in testing environment 230, it may be exposed to various testing conditions, such as a fault injection. The response of subject computer application 235 to the various testing conditions, and/or the response of testing environment 230 computer system as it is operating the subject computer application 235, may be observed or recorded.

Computer resources 231 comprise one or more computer resources, such as computer resources 231a, and 231b through 231n, that support subject computer application 235 and/or the operation of the testing environment 230 computer system. For example, a computer resource 231a may be utilized by subject computer application 235 during its operation. Alternatively, a computer resource 231b may be used for the operation of the testing environment 230 computer system, but not necessarily used by subject computer application 235. Computer resources 231 may comprise any combination of virtual and/or physical computer resources. Aspects of one or more computer resources 231 may be controlled by experimentation platform 220 (or a subcomponent) to facilitate testing of subject computer application 235. For example, a computer resource 231n may be configured by experimentation platform 220 (or a subcomponent) to be unavailable or to have limited availability for at least a portion of time that subject computer application 235 is operating and being observed.

Testing condition(s) controller 222 is generally responsible for determining testing conditions for environment 230. Embodiments of testing condition(s) controller 222 specify testing conditions of testing environment 230, which may include specifying the state or configuration of one or more computer resources 231. In particular, aspects of testing environment 230 may be controlled according to various testing conditions that specify characteristics of the testing environment 230 computer system on which subject computer application 235 operates, such as conditions regarding one or more computer resources 231 and/or other computer applications that are operating on the testing environment 230 computer system and that can impact the status of one or more computer resources 231. For example, in one embodiment, a particular testing condition specified by testing condition(s) controller 222 comprises a configuration of the testing environment 230 for a testing session during which subject computer application 235 operates on the testing environment 230 computer system. The configuration of the testing environment 230 that is specified by testing condition(s) controller 222 may include the configuration(s) of various computer resources 231 of the environment, such as whether a particular computer resource 231n is available or unavailable or has reduced availability at various times of a testing session during the operation of the subject computer application 235. In some instances, testing condition(s) controller 222 may specify a state or configuration of a computer resource 231 prior to or during the operation of the subject computer application 235 that is being tested.

As described herein, a subject computer application 235 may be operated on a testing environment 230 computer system where it is evaluated under typical or ideal conditions and where it is subjected to one or more failure incidents. In particular, while operating under typical conditions, testing condition(s) controller 222 may specify a typical configuration of computer resources 231, such as a configuration of computer resources 231 that would be expected during the operation of the subject computer application 235 in an operating environment (such as operating environment 260). In embodiments where multiple testing sessions are performed, testing condition(s) controller 222 may specify the same configuration of computer resources 231 or may specify a different configuration of computer resources 231 for at least some of the sessions. These differences in configurations of computer resources 231, as specified by testing condition(s) controller 222 as a typical condition, may account for various changes in context or differences in the state of the computer system that may be expected to occur typically. In this way for example, a subject computer application 235 can be tested under various conditions of testing environment 230 that are not necessarily the same, but are all nevertheless typical conditions in so far as these conditions would not be unusual if they were to occur in an operating environment.

In the embodiments that evaluate a subject computer application 235 under ideal conditions, testing condition(s) controller 222 may specify a configuration of computer resources 231 such that particular computer resources 231 are not constrained during their use by subject computer application 235. For example, under ideal conditions specified by testing condition(s) controller 222, a subject computer application 235 may always have available the computer resources 231 it needs, and particular computer resources 231 may operate without error or unexpected latency.

Where subject computer application 235 operates in a testing environment 230 that is subjected to a failure incident, embodiments of testing condition(s) controller 222 can determine a particular failure incident to occur. For example, testing condition(s) controller 222 may specify a failure incident comprising one or more faults to be introduced into the testing environment 230. Testing condition(s) controller 222 may specify that an initial failure incident (referred to herein as a fault origin) is to be introduced to testing environment 230, such as a particular computer resource 231a failing, becoming unavailable, or having limited availability for at least a portion of time during the testing session for the subject computer application 235. In some instances, subsequent to being introduced into the testing environment 230, the failure incident specified by testing condition(s) controller 222 may cause other resulting errors regarding the operation of subject computer application 235. Accordingly, the failure incident may be considered to be a root cause of those other errors resulting from the introduction of the failure incident.

The process of operating a subject computer application 235 in a testing environment 230 that is subjected to a failure incident may be repeated for different types of failure incidents. Accordingly, some embodiments of testing condition(s) controller 222 specify a set of different failure incidents to be introduced into the testing environment 230 across various testing sessions. For example, at least one testing session may be carried out for each failure incident of the set. Testing condition(s) controller 222 can also specify introducing multiple failure incidents into the same testing session. Testing condition(s) controller 222 may also specify failure incidents according to a predetermined routine or schedule. In some embodiments, testing condition(s) controller 222 employs chaos engineering to determine at least a portion of testing conditions based on chaos testing and/or breaking tests.

Testing engine 224 is generally responsible for managing the operation of testing environment 230 including conducting testing sessions of the operation of a subject computer application 235 on a testing environment 230 computer system. Embodiments of testing engine 224 can operate testing sessions on testing environment 230 according to testing conditions specified by testing condition(s) controller 222. Testing engine 224 can also re-initialize testing environment 230 between testing sessions so that testing conditions of a prior testing session are not still present in the testing environment 230. In embodiments where multiple testing sessions are conducted, testing engine 224 manages each testing session.

Some embodiments of testing engine 224 comprise a management console to facilitate conducting testing sessions. For example, some embodiments of testing engine 224 include a management console having a user interface for receiving user-input of testing conditions and/or for viewing data or results associated with testing, such as information regarding the operational state of testing environment 230 as a subject computer application 235 is being tested.

Telemetry data recorder 226 is generally responsible for recording telemetry data associated with a testing session. In particular, for a given testing session of a subject computer application 235, embodiments of telemetry data recorder 226 may record a set of telemetry data regarding the testing environment 230. This set of telemetry data thus comprises information about the testing environment 230 computer system during the operation of the subject computer application 235 for the given testing session. In embodiments wherein multiple testing sessions are conducted, telemetry data recorder 226 may be used to obtain a plurality of telemetry data sets. In some embodiments, telemetry data recorder 226 captures telemetry data before, during, and/or after the operation of subject computer application 235 so that information regarding the testing environment 230 computer system is obtained for a time before the operation of subject computer application 235, during the operation of subject computer application 235, and/or subsequent to the operation of subject computer application 235.

Some embodiments of telemetry data recorder 226 utilize one or more sensors, such as sensors 103*a* and 107 described in connection to FIG. 1, to capture or otherwise determine aspects of the telemetry data. A sensor comprises a function, routine, component, or combination thereof for sensing, detecting, or otherwise obtaining information such as telemetry data and may be embodied as hardware, software, or both. Accordingly, telemetry data may include data that is sensed or determined from one or more sensors (referred to herein as sensor data). Alternatively or in addition, some aspects of telemetry data may be received by telemetry data recorder 226 from a data source, such as data sources 104*a* through 104*n* described in connection to FIG. 1. For instance in an embodiment, one such data source 104*a* comprises a telemetry data instrumentation library that includes one or more instrumentation programs or agents for providing observation data on an aspect of computer system operation. As another example, in some embodiments, a log of system events that can include application and system messages, warnings, errors, or other similar events, is generated by an operating system service of the testing environment 230 computer system. Information from this event log data source may be accessed or otherwise received by telemetry data recorder 226 so that it can be included in the telemetry data. In some embodiments, telemetry data recorder 226 comprises a telemetry data capture tool, which may include other tools to facilitate telemetry data capture, such as an API, drop-in instrumentation, or monitoring agent, for instance, and which may be provided as part of a software development tool kit. For example, some embodiments of experimentation platform 220 that are part of software development tool kit such as Azure Chaos Studio™, by Microsoft Corporation®, use a telemetry data capturing tool to determine telemetry data. In some embodiments, the telemetry data captured by telemetry data recorder 226 is determined using a collection of system monitoring services or monitoring agents that are part of experimentation platform 220.

In testing sessions wherein testing condition(s) controller 222 specifies typical conditions of testing environment 230 or specifies ideal conditions of testing environment 230, the set of telemetry data that is recorded by telemetry data recorder 226 may be referred to herein as normal-operation telemetry data or ideal-operation telemetry data, respectively. In testing sessions where a failure incident is introduced, the set of telemetry data that is recorded by telemetry data recorder 226 may be referred to herein as fault state telemetry data. Some instances of fault state telemetry data can include information that is captured regarding the failure incident that is introduced. It is further contemplated that in some circumstances, testing condition(s) controller 222 may specify a particular failure incident testing condition for testing environment 230, such as injecting a particular fault, but the actual resulting condition of testing environment 230 may be different than what was specified. For example, the testing conditions may specify configuring a particular computer resource 231*a* to experience a fifty percent increase in latency. But due to other circumstances in the testing environment 230, such as the operation of other applications, the computer resource 231*a* may have a greater or lesser latency than the fifty percent increase. In such circumstances, the telemetry data recorder 226 may capture or determine the actual testing condition (i.e., the actual condition of the testing environment) rather than the specified testing condition (i.e. the condition of the testing environment that was specified by testing condition(s) controller 222). For example, telemetry data recorder 226 may use a sensor to determine that the particular computer resource 231*a* actually has a sixty-five percent increase in latency rather than the fifty percent increase that is the specified testing condition.

In some embodiments, information regarding the particular testing conditions for each testing session, which may include the specified and/or actual testing condition for sessions where a failure is introduced, is associated with the telemetry data set recorded by the telemetry data recorder 226 for that testing session. For embodiments having this associated information regarding the particular testing conditions, a particular set of telemetry data may be identified as comprising normal-operation telemetry data, ideal-operation telemetry data, or fault state telemetry data. The telemetry data sets captured by telemetry data recorder 226 may be stored in a telemetry data store 282 in storage 285, where they may be accessible to other components of system 200. In some embodiments information regarding the particular testing conditions associated with each telemetry data set is stored in storage 285.

In some embodiments, a telemetry data set is organized and/or stored as structured or semi-structured data. In particular, aspects of a telemetry data set may be captured (e.g., by telemetry data recorder 226 for a testing session) as structured (or semi-structured) data according to a telemetry data schema. Alternatively or in addition, aspects of the telemetry data set may be converted (e.g., by telemetry data recorder 226 or experimentation platform 220) into structured (or semi-structured) data according to a telemetry data schema. For example, in one embodiment, aspects of the telemetry data of a telemetry data set comprise one or more n-dimensional vectors representing various characteristics of the testing environment during the testing session. Various aspects of telemetry data may be structured or organized as one or more feature vectors and/or as feature-value pairs, which may be hierarchical in some aspects, such as a JSON hierarchy or other hierarchical structure. For example, telemetry data representing an occurrence of a particular system event may be structured, according to a telemetry data schema, as a feature vector comprising a timestamp for the event (or in some instances for its start time, end time, and/or duration), an event-type ID that indicates the type of event that occurred, and series of one or more event-type attributes each having a corresponding value, which might be zero or null in instances where the event-type attribute is not detected. For instance, the feature vector for this example system event occurrence may be structured as: \Timestamp:20220601 \EventTypeID:06 \EventTypeAttrb_1:0.005 \EventTypeAttrb_2:0\ . . . EventTypeAttrb_n:0 \. Particular aspects of the telemetry data may be present in some but not all of the telemetry data sets for all sessions. For instance a particular event may occur sometimes but not always. However, organization of a telemetry data set as structured (or semi-structured) data or according to a schema facilitates the comparison telemetry data from different telemetry data sets, as described herein. In some embodiments that use a telemetry data schema to structure telemetry data, the same or a similar telemetry data schema is utilized across the testing sessions of a subject computer application 235 in an evaluation environment 210 and for the operation of the subject computer applications 235 in an operating environment 260, in order to facilitate comparisons of the telemetry. For example, some embodiments utilize a telemetry schema developed by OpenTelemetry, which provides open source observability framework for capturing and processing telemetry data. In some instances where different telemetry data schemas are used, a translation or mapping may be utilized so that telemetry data that structured according to the different schemas may be compared.

Continuing with FIG. 2, system 200 includes fault profile generator 250. Fault profile generator 250 is generally responsible for determining and generating a fault profile, as described herein. For example, a fault profile can include fault features, such as information about a particular failure incident and aspects of telemetry data that typically occur in connection with the failure incident and thus may be considered indicative of the failure incident. Embodiments of fault profile generator 250 may generate a set of one or more fault profiles for a subject computer application 235 such that each fault profile in the set corresponds to a different failure incident or different testing conditions of testing environment 230.

For example and at a high level according to one embodiment, fault profile generator 250 receives a normal-operation telemetry data set and a fault state telemetry data set from telemetry data store 282 in storage 285 or from telemetry data recorder 226. Fault profile generator 250 (or its subcomponents) performs a comparison of the two telemetry data sets to determine particular aspects of the telemetry data that occur in the fault state telemetry data but not in the normal-operation telemetry data. Based on the differences, a set of one or more fault features is determined. Fault profile generator 250 associates the determined fault features with information from the fault state telemetry data set indicating the failure incident and stores the information as a fault profile. The fault profiles are typically generated by fault profile generator 250 during pre-production or non-production development and testing (for example, within an evaluation environment 210), but in some instances may be generated as a subject computer application (such as subject computer application 265) as operating in an operating environment 260.

As shown in example system 200, fault profile generator 250 comprises telemetry data comparer 252, fault features determiner 254, and fault profile assembler 256. Telemetry data comparer 252 is generally responsible for performing a comparison of two or more sets of telemetry data to determine differences in the telemetry data among the compared sets. For example, in one embodiment, two telemetry data sets are compared comprising a normal-operation (or an ideal operation) telemetry data set and a fault state telemetry data set. A set of differences between the two telemetry data sets are determined. Based on the comparison performed by telemetry data comparer 252, the differences in the sets of telemetry data may be provided to fault features determiner 254 for determining particular fault features corresponding to a failure incident indicated by the fault state telemetry data set that was used in the comparison.

Some embodiments of telemetry data comparer 252 compare telemetry data features and/or feature values for the same (or similar) feature types in order to determine differences between different sets of telemetry data. In particular, features that are determined to be different, which may include features and their corresponding feature values, may be used for determining the fault features. In some embodiments, a feature difference threshold is utilized for comparing a particular feature from each of the telemetry data sets, such that minor differences in feature values (e.g., feature value differences that do not exceed the difference threshold) are not considered to be sufficiently different enough for that feature to be used as a fault feature. Some embodiments, of telemetry data comparer 252 determine a distance (e.g., a Euclidian or Cosine distance) between a first feature vectors from a first telemetry data set being compared and a second corresponding feature vector from a second telemetry data set being compared. In some of these embodiments, a distance threshold is used, similar to the difference threshold described previously, such that minor differences among the feature vectors are excluded.

Some embodiments of telemetry data comparer 252 (or fault profile generator 250 or another subcomponent) utilize telemetry data comparison logic 290 to facilitate performing a comparison of telemetry data sets and/or determining fault features. Telemetry data comparison logic 290 can include rules, conditions, associations, classification models, or other criteria to determine feature similarity (and thus feature differences) of telemetry data across two or more telemetry data sets. For example, in one embodiment, telemetry data comparison logic 290 includes a set of rules for comparing feature values for identical feature types, and determining a level of similarity (or difference) of feature values for similar feature types. For instance, some embodiments may utilize classification models such as statistical clustering (e.g., k-means or nearest neighbor) or a proximity of features to each other on a semantic knowledge graph, neural network, data constellation map, or other classification techniques to determine similarity or differences. In particular, different similarity techniques may be used for different types of features. Accordingly, telemetry data comparison logic 290 can take many different forms depending on the mechanism used to identify similarity and the feature types for which similarity (and thus difference) is being determined. For example, in an embodiment, the telemetry data comparison logic 290 comprises one or more of static rules (which may be predefined or may be set based on settings by a system administrator or developer), Boolean logic, fuzzy logic, neural network, finite state machine, decision tree (or random forest or gradient boosting), support vector machine, logistic regression, clustering, or machine learning techniques, similar statistical classification processes, other rules, conditions, associations, or combinations of these to identify and quantify feature similarity, and thus feature differences.

In some embodiments, telemetry data comparer 252 determines a similarity score or similarity weighting for a telemetry data feature that is compared across two or more telemetry data sets. In some embodiments, telemetry data comparer 252 outputs a feature similarity vector of similarity scores, which may correspond to two (or more) telemetry data feature vectors, each from a different telemetry data set, that are compared. In some instances, the similarity score (or vector of similarity scores) is used by fault features determiner 254 to rank telemetry data features based on their level of difference (or effectively ranking them in terms of their capability to function as fault features). Thus, a score indicating a high-degree of similarity implies that the particular feature will be less effective as indicating a fault, and thus should not be used as a fault feature, because of the similarity to other features. For example, where a first particular telemetry data feature in a fault state telemetry data set is too similar to a second, corresponding telemetry data feature in a normal-operation telemetry data set, then the first telemetry data feature may be expected to perform poorly as a fault feature because it is too similar to a feature of the normal operation telemetry data. Instead, another feature (if there is one) having a score indicating a low-degree of similarity would be better suited to be used as a fault feature.

In some embodiments, where multiple testing sessions are performed for operating a particular subject computer application 235 to produce a plurality of data sets of normal-operation telemetry data (or a plurality of data sets of ideal-operation telemetry data), telemetry data comparer 252 may be used to compare at least a portion of these plurality of data sets against each other so that outliers can be removed, such as particular telemetry data features present in only some of these data sets. Some embodiments of telemetry data comparer 252 use telemetry data comparison logic 290 to perform these comparisons. For example, telemetry data comparison logic 290 may be used in these instances to facilitate determining similarity among compared telemetry data features of the normal-operation (or ideal-operation) telemetry data sets. In this way, a normal-operation telemetry data set (or an ideal-operation telemetry data set) can be generated that comprises telemetry data features that are more likely to be present in every instance or session of normal operation (or ideal operation).

Similarly, in some embodiments, where multiple testing sessions are performed for the same type of failure incident while operating a particular subject computer application 235 to produce a plurality of fault state telemetry data sets, telemetry data comparer 252 may be used to compare at least a portion of these plurality of data sets against each other so that outliers can be removed, such as particular telemetry data features present in only some of these data sets. Some embodiments of telemetry data comparer 252 use telemetry data comparison logic 290 to perform these comparisons. For example, telemetry data comparison logic 290 may be used in these instances to facilitate determining similarity among compared telemetry data features of the fault state telemetry data sets. In this way, a fault state telemetry data set can be generated that comprises those telemetry data features that are more likely to be present in every instance of the failure incident.

In some embodiments, where multiple testing sessions produce a plurality of sets of normal-operation telemetry data, ideal-operation telemetry data, and/or fault state telemetry data, telemetry data comparer 252 (or fault profile generator 250) may use aspects of the telemetry data from the plurality of data sets of the same type (e.g., normal-operation, ideal-operation, or fault state) to generate a composite telemetry data set. For example, for a plurality of sets of normal-operation telemetry data, telemetry data comparer 252 (or fault profile generator 250) may determine average feature values of the feature data and use those values to build a composite telemetry data set of normal-operation telemetry data. Similarly, other statistical determinations may be performed, such as median, mode, distributions, or similar representations of feature values may be determined and used as composite values in a composite telemetry data set.

Fault features determiner 254, in general, is responsible for determining particular telemetry data that is expected to occur when a subject computer application 235 operates in a condition subjected to a failure incident. The particular telemetry data determined by fault features determiner 254 may be considered indicative of the failure incident and thus comprises fault features. In particular, based on a comparison of the telemetry data sets performed by telemetry data comparer 252 that determines a difference in the telemetry data, fault features determiner 254 determines a set of one or more fault features. In an embodiment, the fault features comprise aspects of the telemetry data, such as particular telemetry data features (or feature values) that are typically present in the fault state telemetry data set but not typically present in the normal-operation telemetry data set (nor typically present in an ideal-operation telemetry data set where an ideal-operation telemetry data set is compared against the fault state telemetry data set).

Some embodiments of fault features determiner 254 utilize a one class support vector machine (SVM) for determining the fault features or for representing fault features in a vectorized form, which may be used to facilitate comparisons of telemetry data features. Some embodiments of fault features determiner 254 use telemetry data comparison logic 290. For example, as described previously, telemetry data comparison logic 290 is used by some embodiments of fault features determiner 254 to rank telemetry data features based on their difference indicating their capability to function as fault features. In some embodiments, fault features determiner 254 (which may use telemetry data comparison logic 290) determines a difference score (or weighting) for a telemetry data feature, indicating a level or degree for which the feature may be effective as a fault feature. Thus for instance, particular features (or feature values) present in a normal-operation telemetry data set and a fault state telemetry data set that have a high similarity (which may be determined using telemetry data comparison logic 290) would have low difference scores because these features are similar and thus less effective as fault features used to identifying a fault state. Moreover, in some embodiments, the difference scores are utilized to rank the telemetry data features as fault features, and in some embodiments, a threshold may be applied to the difference score such that only features having a corresponding difference score that satisfies the threshold may be utilized as fault features.

Some embodiments of fault features determiner 254 utilize (or some embodiments of telemetry data comparison logic 290 utilized by fault features determiner 254 include) probabilistic classification logic for classifying a particular telemetry data feature as a fault feature. In some embodiments, for particular features, the classification may be binary or may be on a spectrum, such as a score or weight associated with the feature. Thus, some embodiments determine a feature-difference score or weighting representing how effective a particular feature may be if used as a fault feature. Some embodiments of telemetry data comparison logic 290 comprise rules for use by fault features determiner 254 to determine which data features are more likely to be better fault features, such as features of the fault state telemetry data having more significance for indicating the failure incident. For example, rules may specify determining a particular fault feature based on the particular types of domains of telemetry data (such as certain metrics or traces, for example). As another example, rules may specify utilizing a similarity score for the telemetry data features (or for specific features or particular type of features) so that features that are more different (e.g., having a lower similarity score) may be more likely to be classified as a fault feature. Similarly, telemetry data comparison logic 290 rules may specify that certain types of telemetry data features should be favored (and thus scored or weighted higher) over other features.

Fault profile assembler 256 is generally responsible for assembling or generating a fault profile. As described previously, a fault profile may include information regarding the set of fault features and an indication of a particular failure incident. Embodiments of fault profile assembler 256 may generate a fault profile based on the set of one or more fault features determined by fault features determiner 254 and an indication of a particular failure incident, which may be identified from the fault state telemetry data that was compared against to determine the fault features. In particular, embodiments of fault profile assembler 256 may determine the indication of the failure incident from the fault state telemetry data, such as information regarding testing conditions associated with the fault state telemetry data. Moreover, in some instances where fault state telemetry data set has associated information regarding an actual testing condition (or where telemetry data features regarding the actual testing condition was captured and is included in the fault state telemetry data), the information about the actual testing condition may be used to determine the indication of the failure incident. In this way, these embodiments of a fault profile generated by fault profile assembler 256 comprise an indication of a failure incident that actually occurred during a testing session, rather than an indication of a failure incident that was specified to occur during the testing session. In some embodiments, at least a portion of the fault features determined by fault features determiner 254 are included in the fault profile generated by fault profile assembler 256. Alternatively or in addition, an indication of at least a portion of the fault features may be included in the fault profile generated by fault profile assembler 256. In some embodiments, a fault profile is generated for each type of failure incident having a corresponding fault state telemetry data set. In this way, embodiments of fault profile assembler 256 may determine a set of fault profiles that are associated with a particular subject computer application 235 such that each fault profile corresponds to a different failure incident.

Some embodiments of a fault profile generated by fault profile assembler 256 comprise a data structure (or portion thereof), as described herein. Some embodiments of a fault profile further include, or have associated therewith, logic or computer instructions to facilitate the detection of particular fault features, to determine the root cause fault, and/or to mitigate a root cause fault, once it is determined. For example, some embodiments of fault profiles include at least a portion of diagnostic logic 295, or point to an aspect of diagnostic logic 295 (discussed further in connection with diagnostic service 270) that corresponds to the particular fault or failure incident indicated by the fault profile. The fault profiles generated by fault profile assembler 256 may be made available to other components of system 200 and/or stored in storage 285, such as in fault profiles data store 284, where they may be accessible to other components of system 200.

Continuing with FIG. 2, the example operating environment 260 of system 200 includes subject computer application 265, computer resources 261, error detector 262, telemetry data recorder 264, and diagnostic service 270. Subject computer application 265 operates on a computer system of operating environment 260 and may utilize one or more computer resources 261 in its operation. In particular, as shown in example system 200, subject computer application 265 is released and operating in a deployed environment such as an end user setting, as opposed to a testing environment. In some embodiments, subject computer application 265 comprises a subject computer application 235 that has been released into an operating environment.

Computer resources 261 comprise one or more computer resources, such as computer resources 261*a*, and 261*b* through 261*n*, that support subject computer application 265 and/or the operation of the operating environment 260 computer system on which subject computer application 265 operates. For example, a computer resource 261*a* may be utilized by subject computer application 265 during its operation. Alternatively, a computer resource 261*b* may be used for the operation of an operating environment 260 computer system on which subject computer application 265 operates, but not necessarily used by subject computer application 265. Computer resources 261 may comprise any combination of virtual and/or physical computer resources, and in some embodiments may comprise the same or similar computer resources as described in connection with computer resources 231.

Error detector 262 is generally responsible for detecting errors in the operation of subject computer application 265. For example, embodiments of error detector 262 may determine that subject computer application 265 has crashed, is lagging or hanging, or otherwise performing sub optimally. Alternatively or in addition, some embodiments of error detector 262 determine that the operating environment 260 computer system on which subject computer application 265 experiences errors during or subsequent to the operation of subject computer application 265, or that one or more other computer applications operating on the operating environment 260 computer system experience errors during or subsequent to the operation of subject computer application 265. The term error is used broadly herein to refer to any unexpected event, condition, or operation of the computer system (e.g., operating environment 260 computer system) and/or subject computer application 265, such as a difference in an expected output verses actual output of performance. For instance, a particular computer service that performs but takes longer than expected (thus causing the user to wait longer than expected) may be considered an error, in some instances.

Some embodiments of error detector 262 comprise an operating system service, such as an operating system error handling service, which monitors aspects of the operating environment 260 computer system and checks for errors. Alternatively or in addition, some embodiments of error detector 262 comprise a monitor or observation service, such as a monitor agent, that observes activity on the operating environment 260 computer system or various aspects of its operation to determine likely errors. For example, the monitor or observation service may detect computer resource conflicts or consider user activity such as a user accessing atask manager or forcibly killing or restating a program, computer system restarts, system events, or other data from operating environment 260 computer system indicating possible error. Some embodiments of fault detector comprise or utilize a computer system event viewer, which provides error detection functionality, such as the Microsoft Windows® Event Viewer service. Upon detecting an error, or subsequent to detecting an error, error detector 262 may communicate an indication of the error to telemetry data recorder 264, or may otherwise provide an indication that an error is detected so that telemetry data recorder 264 can determine telemetry data associated with the error.

Telemetry data recorder 264 is generally responsible for recording telemetry data associated with an operating environment 260 computer system, which may include telemetry data associated with the operation of subject computer application 265. The telemetry data regarding operating environment 260 computer system and/or the operation of subject computer application 265 is sometimes referred to herein as operating state telemetry data. Some embodiments of telemetry data recorder 264 are embodied as a telemetry data recorder 226 or include functionality described in connection with telemetry data recorder 226, but operate in an operating environment 260, rather than an evaluation environment 210. For example, some embodiments of telemetry data recorder 264 are configured like telemetry data recorder 226 to capture and generate a set of telemetry data as described in connection with telemetry data recorder 226. Thus, an operating state telemetry data set may comprise a set of structured or semi structured telemetry data, such as described in connection with telemetry data recorder 226.

Embodiments of telemetry data recorder 264 may capture telemetry data based on an indication of an error, which may be detected by error detector 262. Accordingly, an operating state telemetry data set captured by telemetry data recorder 264 in such circumstances includes telemetry data that is related to the error and/or telemetry data representing aspects of the state of the operating environment 260 computer system during the error, before the error, or after the error. In some embodiments, telemetry data recorder 264 records the telemetry data as needed, such as in connection with an operating environment error. In some embodiments, telemetry data recorder 264 captures telemetry data continuously, nearly continuously, or periodically, so that upon an indication of an error (or subsequent to an indication of an error), telemetry data regarding operating environment 260 computer system and/or the operation of subject computer application 265 may be determine for a time window that is before, during, and/or after the occurrence of the error (or for a portion of time during the error's occurrence where the error is persistent). For example, in one embodiment, telemetry data recorder 264 records telemetry data into a circular buffer memory or a similar memory structure that is configured to continuously receive and store telemetry data by holding telemetry data for a recent duration of time and replacing the oldest telemetry data in the memory with newer telemetry data. An operating state telemetry data set determined by telemetry data recorder 264 may be made available to other components of system 200 and/or stored in storage 285, such as in telemetry data store 282, where it is accessible to other components of system 200.

Diagnostic service 270 is generally responsible for determining root causes of errors, such as a particular fault that leads to an error associated with a computer application or in connection with a computer system. In particular, embodiments of diagnostic service 270 may determine a root cause of an error associated with subject computer application 265 operating on an operating environment 260 computing system. Some embodiments of diagnostic service 270 further perform operations to mitigate a fault that is the root cause of an error and/or mitigate the error resulting from the root cause fault. For example, these operations may include recommending or automatically implementing changes to the configuration of operating environment 260 computing system and/or one or more computer resources 261 associated with operating environment 260, modifications to the configuration or topology of subject computer application 265, such as particular computer resources 261 that it uses and/or when or how those computer resources 261 are used, and/or other changes to the operation of subject computer application 265 on an operating environment 260 computing system. In some embodiments, diagnostic service 270 comprises a computer service or routine that runs as needed; for example, diagnostic service 270 may operate automatically subsequent to the detection of an error by error detector 262. Alternatively or in addition, diagnostic service 270 may be launched by a user of an operating environment 260 computing system, for example.

As shown in example system 200, diagnostic service 270 comprises relevant fault profile determiner 272 and root cause fault determiner 274. Relevant fault profile determiner 272 is generally responsible for determining one or more fault profiles that are relevant to an error associated with a computer application or in connection with a computer system, such as an error detected by error detector 262. Embodiments of relevant fault profile determiner 272 (or diagnostic service 270) receive (or access) operating state telemetry data that is associated with an error, such as a telemetry data set captured by telemetry data recorder 264 based on an error detected by error detector 262. In some embodiments, the operating state telemetry data is received from telemetry data recorder 264 or from storage 285, such as telemetry data store 282. Embodiments of relevant fault profile determiner 272 (or diagnostic service 270) also receive (or access) a set of one or more fault profiles associated with a particular subject computer application 265 that is operating or installed on the operating environment 260 computing system from which the operating state telemetry data was captured. Some embodiments of relevant fault profile determiner 272 include functionality for determining a particular subject computer application 265 that is operating or installed on the operating environment 260 computing system from which the operating state telemetry data was captured. For example, some embodiments of relevant fault profile determiner 272 are configured to determine a particular subject computer application 265 based on a process list of currently running computer services or computer applications; a registry or configuration file(s) of the operating system of the operating environment 260 computer system; or by polling, interrogating, or scanning the operating environment 260 computer system.

This set of fault profiles received by relevant fault profile determiner 272 may comprise one or more fault profiles that were generated during evaluation environment 210 testing of the subject computer application 265 and are thus associated with the subject computer application 265. Some embodiments of fault profiles include information regarding the particular computer application that is associated with the fault profile, such as an application ID or version information for the subject computer application 265, which may be used by relevant fault profile determiner 272 to determine the set of fault profiles associated with the subject computer application 265. The set of fault profiles associated with the subject computer application 265 may be received from fault profiles data store 284 of storage 285.

With the set of fault profiles and the operating state telemetry data, embodiments of relevant fault profile determiner 272 perform a comparison of the operating state telemetry data against each fault profile of the set, to determine a relevant fault profile. In some embodiments, the relevant fault profile comprises the fault profile that has fault features most similar to the operating state telemetry data (i.e., the closest matching fault profile). Some embodiments of relevant fault profile determiner 272 utilize telemetry data comparison logic 290, (described previously), to facilitate performing a comparison of the operating state telemetry data and fault features of each fault profile. For example, in one embodiment, for each fault profile, a similarity comparison is performed among telemetry data features that are fault feature of the fault profile and telemetry data features of the operating state telemetry data, and the fault profile that is most similar to the operating state telemetry data is determined as the relevant fault profile. In some embodiments, relevant fault profile determiner 272 utilizes a classification model of telemetry data comparison logic 290, such as a machine learning model, to classify operating state telemetry data as matching or close to a particular fault profile. For example, in one embodiment, information from the operating state telemetry data is fed into an artificial neural network classifier that is a machine learning model that has been trained on the fault profiles, so that operating state telemetry data is classified as being most similar to one of the fault profiles. In some embodiments, telemetry data comparison logic 290 may specify one or more rules for relevant fault profile determiner 272 to determine a relevant fault profile. For example, particular rules may be employed to filter out certain fault profiles likely to be irrelevant or to determine a subset of fault profiles more likely to be relevant, prior to the comparison. In this way, computational time for performing the comparisons of fault profiles against the operating state telemetry data is further reduced. In another example embodiment, a decision tree (or random forest or gradient boost) of telemetry data comparison logic 290 is employed to classify a fault profile as relevant and/or to eliminate a fault profile as irrelevant.

In some embodiments, relevant fault profile determiner 272 determines (or telemetry data comparison logic 290 includes instructions for determining) a relevance score for the fault profiles that are compared against the operating state telemetry data. For embodiments where relevance is based on a similarity comparison, the relevance score may comprise a similarity score or a similar indication of similarity. Based on the relevance score, the fault profile having the highest relevance score (or a relevance score indicating the highest degree of relevance) is determined as the relevant fault profile to be used by diagnostic service 270 for determining a potential root cause fault. In some embodiments, where multiple fault profiles can be determined as relevant (for example, multiple fault profiles that have similarity to aspects of the operating state telemetry data), the plurality of relevant fault profiles may be ranked based on their relevance or similarity, for example, based on their relevance scores. The highest ranking fault profile (for example, the fault profile that is most relevant or has the highest relevance score) then may be used by diagnostic service 270 for determining a potential root cause fault. In some embodiments, a relevance threshold is employed so that those fault profiles satisfying the relevance threshold (for example, those fault profiles having a relevance score that exceeds the relevance threshold) are deemed to be relevant fault profiles. Each of these relevant profiles then may be utilized by diagnostic service 270 for determining a potential root cause fault.

In some embodiments where two or more fault profiles have approximately the same relevance, such as having approximately the same similarity to the operating state telemetry data or each fault profile having a relevance score that is within a threshold range of the other relevance scores, then each of fault profiles may be utilized by diagnostic service 270 for determining a potential root cause fault. In addition or alternatively, diagnostic service 270 (or diagnostic logic 295, described below) may flag these two or more fault profiles and/or subject computer application 265 for additional testing, or may specify that additional testing should be performed for the failure incidents associated with these two or more fault profiles. In this way, additional, different telemetry data can be captured and used to provide new or additional fault features so that a more discriminating comparison can be performed against the operating state telemetry data.

In some instances, more than one subject computer application 265 is operating or installed on the operating environment 260 computer system. Accordingly, in some embodiments, relevant fault profile determiner 272 determines at least one subject computer application 265 for which a set of one or more fault profiles is received and used to determine a relevant fault profile. For example, in some embodiments, a particular subject computer application 265 that is operating at the time of the error detection may be determined, so that its corresponding set of fault profile s are utilized, over another subject computer application 265 that is installed but not operating at the time of the error. In some embodiments, a particular subject computer application 265 that is associated with an error detected by error detector 262 may be determined (for example, the detected error relates to the operation of this particular subject computer application 265, such as the subject computer application 265 not performing as expected), so that its corresponding set of fault profiles are utilized, over another subject computer application 265 that is not associated with the detected error.

In some embodiments, where multiple subject computer applications 265 are installed or operating on the operating environment 260 computer system, multiple sets of one or more fault profiles are received by relevant fault profile determiner 272, such that each set of fault profiles received corresponds to one of the subject computer applications 265. A comparison operation, such as described previously, then may be performed using each set of fault profiles. Based on these comparisons, the relevant fault profile for each set is determined (or a plurality of relevant profiles for each set is determined, such as described above) thereby forming a plurality of relevant profiles. In some embodiments, this plurality of relevant profiles (or at least a portion of this plurality) is used by diagnostic service 270 to determine at least one potential root cause fault. Alternatively, in some embodiments, the most relevant fault profile, from this plurality of relevant profiles, is used by diagnostic service 270 to determine a potential root cause fault.

Root cause fault determiner 274 is generally responsible for determining a potential root cause of an error associated with a computer application or in connection with a computer system. Embodiments of root cause fault determiner 274 use a relevant fault profile (or use at least one relevant fault profile for those embodiments where more than one fault profile are determined to be relevant) to determine a potential root cause of an error, such as an error detected by error detector 262. The relevant fault profile used by root cause fault determiner 274 may be determined by relevant fault profile determiner 272.

Embodiments of root cause fault determiner 274 determine a potential root cause of the error based on information from a relevant fault profile. In particular, based at least in part on a failure incident indicated in a relevant fault profile, root cause fault determiner 274 determines a potential root cause fault of the error. In some embodiments, the root cause fault is determined as the failure incident indicated in the relevant fault profile. In some embodiments where multiple relevant fault profiles are determined, a set of potential root cause faults is determined as the failure incidents indicated in each of the relevant fault profiles.

Some embodiments of root cause fault determiner 274 (or diagnostic service 270 or another subcomponent) utilize diagnostic logic 295 to facilitate determining a potential root cause fault. Diagnostic logic 295 comprises computer instructions that can include rules, conditions, associations, classification models, or other criteria for determining a root cause fault, and in some embodiments, may further comprise mitigation operations. In some embodiments, particular aspects of diagnostic logic 295 are accessed and utilized by root cause fault determiner 274 based on an indication of a failure incident in a relevant fault profile. Moreover, as described previously, some embodiments of fault profiles include at least a portion of diagnostic logic 295 (or point to an aspect of diagnostic logic 295) that corresponds to the particular failure incident indicated by the fault profile. Thus in some embodiments, diagnostic logic 295 comprises diagnostic logic that is specific to a particular failure incident. For example, for some failure incidents indicated in a relevant fault profile, diagnostic logic 295 may specify that a potential root cause fault is the failure incident. For other failure incidents, diagnostic logic 295 may include other logic for determining a potential root cause, such as logic for further testing or classification.

In some embodiments, diagnostic logic 295 includes logic that comprises computer-executable instructions for programmatically determining, from operating state telemetry data or from other information obtained about the operating environment 260 computer system, an indication of a root cause fault. For example, some embodiments of diagnostic logic 295 may include computer-executable instructions for performing diagnostic testing such as polling or querying on the operating environment 260 computer system. In some embodiments, the diagnostic testing comprises determining information regarding the status of one or more computer resources 261, in order to determine that a particular failure incident indicated in a relevant fault profile is a likely root cause fault.

Further, some embodiments of diagnostic logic 295 for programmatically determining a root cause fault include computer-executable instructions for querying or processing operating state telemetry data or other data regarding the operating environment 260 computer system to detect particular conditions indicative of a particular root cause fault. For example, in some embodiments, diagnostic logic 295 includes specific logic corresponding to a failure incident indicated in a relevant fault profile, and which comprises computer-executable instructions for querying or processing operating state telemetry data or other data regarding the operating environment 260 computer system to detect particular conditions indicative of a particular root cause fault.

Some of embodiments of diagnostic logic 295 may include logic for inferring a likely root cause fault, based on information from a relevant profile, such as information regarding a failure incident indicated in the relevant fault profile and/or based on state telemetry data or from other information obtained about the operating environment 260 computer system. For example, based on a relevance score (or a similarity determination) of the relevant fault profile comparison against operating state telemetry data, determined by relevant fault profile determiner 272, the failure incident indicated in the relevant fault profile may be inferred as a root cause fault.

Some embodiments of diagnostic logic 295 comprise classification logic for classifying or inferring a likely root cause fault. The classification may be based in part on information from operating state telemetry data or from other information obtained about the operating environment 260 computer system. For example, in some of these embodiments, particular types of failure incidents have one or more corresponding root-cause-fault classification models. The classification models may be trained using telemetry data as training data that are labeled according to root cause faults. Operating state telemetry data and/or other data regarding the operating environment 260 computer system may be inputted into classification model(s) which can output a classification of a potential root cause fault.

Accordingly, diagnostic logic 295 may take different forms depending on the particular embodiment, particular error detected by error detector 262, or failure incident indicated in a relevant profile, and may comprise combinations of the logic described herein. For example, the diagnostic logic 295 may comprise a set of rules (which may include static or predefined rules or may be set based on system administrator settings, Boolean logic, decision trees (e.g., random forest, gradient boosted trees, or similar decision algorithms), conditions or other logic, classification model, a deterministic or probabilistic classifier, fuzzy logic, neural network, finite state machine, support vector machine, logistic regression, clustering, machine learning algorithms, similar statistical classification processes, or combinations of these.

Based on a root cause fault (or based on at least one potential root cause fault) determined by root cause fault determiner 274, diagnostic service 270 (or another component of system 200) may provide an indication of the root cause fault and/or perform another action, such as a mitigation operation. For instance, in some embodiments, the operating environment 260 computer system presents an indication of the root cause fault. In some embodiments, an electronic notification indicating the root cause fault is generated, and may be communicated or otherwise provided to a user or application developer of subject computer application 265, or to a system event handler associated with the operating environment 260 computer system. In some embodiments, the electronic notification comprises an information technology (IT) ticket or similar repair request that is generated automatically and may be communicated to an appropriate IT resource or placed in a ticket queue. In some embodiments, diagnostic service 270 (or another component of system 200) automatically generates a log (or updates a log in a log file, such as a system event log) indicating information regarding the root cause fault, and in some instances further indicating information about the detected error, subject computer application 265, and/or aspects of operating state telemetry data. In some embodiments, a system event log that includes information regarding the error detected by error detector 262 may be modified to further include supplemental information regarding the root cause fault, which represents the potential root cause of the error. For example, a system event log entry for the error may be annotated to further include an indication of the root cause fault (or a plurality of potential root cause faults).

In some embodiments, an indication of the root cause fault that is presented (or otherwise provided) is accompanied by a recommended mitigation operation such as a suggested modification to the configuration of the operating environment 260 computer system and/or subject computer application 265 that may mitigate the root cause error and/or mitigate the error detected by error detector 262. In particular and as described previously, some embodiments of diagnostic logic 295 include a set of mitigation operations that correspond to particular root cause faults and/or detected errors and may be utilized for mitigating those root cause faults and/or detected errors. For example, these mitigation operations may include recommending or automatically implementing changes to the configuration of operating environment 260 computing system and/or one or more computer resources 261 associated with operating environment 260, modifications to the configuration or topology of subject computer application 265, such as particular computer resources 261 that it uses and/or when or how those computer resources 261 are used, and/or other changes to the operation of subject computer application 265 on an operating environment 260 computing system.

Accordingly, in some embodiments, one or more mitigation operations are accessed that correspond to the root cause fault determined by root cause fault determiner 274.

The mitigation operations may be accessed from diagnostic logic 295 by diagnostic service 270 or another component of system 200. Based on a particular root cause fault determined by root cause fault determiner 274, the corresponding mitigation operation is determined, from the set of mitigation operations, and is provided along with an indication of the particular root cause fault. Alternatively or in addition, diagnostic service 270 (or another component of system 200) may automatically perform the corresponding mitigation operation. For example, if the root cause fault indicates that the fault origin is due to a particular computer resource being unavailable, then some embodiments of the mitigation operation may include computer executable instructions for modifying the configuration of the particular computer resource or controlling its use by other computer applications that are operating on the operating environment 260 computer system. For instance, the mitigation operation may specify throttling, rescheduling, or terminating another computer application that is using the particular computer resource so that the particular computer resource is available for use by subject computer application 265.

Turning now to FIGS. 3 and 4, aspects of example process flows 300 and 400 are illustratively depicted for some embodiments of the disclosure. Process flows 300 and 400 each comprise a method (sometimes referred to herein as method 300 and method 400) that may be carried out to implement various example embodiments described herein. For instance, process flow 300 or process flow 400 may be performed to programmatically determine a root cause of an error, such as an error associated with a computer application, and to facilitate mitigation of the root cause of the error thereby improving the operation of the computer application.

Each block or step of process flow 300, process flow 400, and other methods described herein comprises a computing process that may be performed using any combination of hardware, firmware, and/or software. For instance, various functions may be carried out by a processor executing instructions stored in memory, such as memory 512 described in FIG. 5 and/or storage 285 described in FIG. 2. The methods may also be embodied as computer-usable instructions stored on computer storage media. The methods may be provided by a stand-alone application, a service or hosted service (stand-alone or in combination with another hosted service), or a plug-in to another product, to name a few. The blocks of process flow 300 and 400 that correspond to actions (or steps) to be performed (as opposed to information to be processed or acted on) may be carried out by one or more computer applications or services, in some embodiments, which may operate on one or more computer devices (such as user device 102a of FIG. 1), server (such as server 106 of FIG. 1), may be distributed across multiple user devices, and/or servers, or by a distributed computing platform, and/or may be implemented in the cloud, such as described in connection with FIG. 6. In some embodiments, the functions performed by the blocks or steps of process flows 300 and 400 are carried out by components of system 200, described in connection to FIG. 2.

With reference to FIG. 3, aspects of example process flow 300 are illustratively depicted for determining a root cause of an error associated with a computer application based on using a fault profile. In particular, example process flow 300 may be performed to generate a fault profile, which may comprise a data structure that includes an indication of fault, such as a failure incident and telemetry data occurring in connection with the fault, such as described in connection with FIG. 2.

At block 310, method 300 includes operating a computer application on a computer system according to a first condition of operation. Embodiments of block 310 operate a computer application, such as a subject computer application 235 described in FIG. 2, on a computer system. In some embodiments, the computer system comprises computer resources that support the operation of the computer application, and operates the computer application in an operating environment, such as a testing environment. The computer application may be operated for a session of time and according to a first condition regarding the operation of computer application on the computer system. In some embodiments, the first condition comprises a normal or expected operational condition. For example, in a normal operation, the computer resources are available to support the operation of the computer application, and any calls to or inputs received by the computer application are as expected. In some embodiments, the first condition comprises a condition wherein the computer application operates without occurrence of an error during the session of time. Some embodiments of block 310 may be carried out using experimentation platform 220 (FIG. 2). Additional details of embodiments of block 310, or for carrying out operations of block 310, are described in connection to FIG. 2, and in particular experimentation platform 220, as well as other components of system 200 operating in connection with experimentation platform 220, (such as those components positioned within experimentation platform 220 in FIG. 2).

At a block 320, method 300 includes monitoring the computer system during the operation to determine a first-condition telemetry data set. Embodiments of block 320 monitor the computer system for the session of time, within which the computer application operates according to the first condition, to determine a first-condition telemetry data set. For example, telemetry data regarding the computer system may be captured (e.g., by one or more telemetry data recorders, such as telemetry data recorder 226 of FIG. 2) over the session of time. In embodiments wherein the first condition comprises a normal operational condition or wherein the computer application operates without occurrence of an error during the session of time, the first-condition telemetry data may be considered normal-operation telemetry data or an ideal-operation telemetry data, respectively, such as described herein in connection with FIG. 2.

In some embodiments of method 300, the operation of the computer application on the computer system according to the first condition of operation is repeated for multiple sessions, and a first-condition telemetry data set is captured for each session, thereby forming a plurality of first-condition telemetry data sets. In these embodiments, a composite first-condition telemetry data is determined as the first-condition telemetry data, based on the plurality of first-condition telemetry data sets. For example, in some embodiments, telemetry data values for each of the first-condition telemetry data sets are averaged, or another statistical operation is performed, to determine a composite telemetry data value to be included in a resulting, composite first-condition telemetry data set. Alternatively or in addition, in some embodiments, a comparison operation (such as described in connection with telemetry data recorder 226 and telemetry data comparison logic 290 of FIG. 2) is performed among the plurality of first-condition telemetry data sets. Based on the comparison, a composite first-condition telemetry data set is determined that includes a set of telemetry data that is present in each of the first-condition telemetry data sets of the plurality or a set of similar telemetry data that is present in each of the first-condition telemetry data sets of the plurality. For example, similar telemetry data occurring in each of the first-condition telemetry data sets (such as telemetry data having similar features and/or feature values, and which may be determined to be similar by utilizing a similarity threshold) is used to generate a composite first-condition telemetry data set. Further, some embodiments of this composite first-condition telemetry data set includes only telemetry data that is present in each of the first-condition telemetry data sets of the plurality and excludes any telemetry data that is not present in each of the first-condition telemetry data sets of the plurality. Some embodiments of block 320 are carried out using telemetry data recorder 226 (FIG. 2). Additional details of embodiments of block 320, or for carrying out operations of block 320, are described in connection to FIG. 2, and in particular telemetry data recorder 226.

At block 330, method 300 includes operating the computer application on the computer system according to a second condition of operation. Embodiments of block 330 operate the computer application on the computer system for a second session of time and according to a second condition regarding the operation of computer application on the computer system. In some embodiments, the second condition comprises an operational condition that is different than the first condition, such as a fault state operational condition. In particular, the computer application may be subjected to one or more testing conditions, which may be determined or specified by a testing conditions controller (such as testing condition(s) controller 222 of FIG. 2). For example, the configuration of various computer resources may be controlled to determine the resiliency of the computer application operating on the computer system. Some embodiments of block 330 may be carried out using testing condition(s) controller 222 and/or testing engine 224 (FIG. 2). Additional details of embodiments of block 330, or for carrying out operations of block 330, are described in connection to FIG. 2, and in particular testing condition(s) controller 222 and testing engine 224.

At block 340, method 300 includes causing a first fault associated with the operation of the computer application. Embodiments of block 340 cause a fault, such as a failure incident (described in connection to FIG. 2) to occur during the operation of the computer application during another, second session of time. For example, causing a fault may comprise causing a failure incident, such as configuring a computer resource to be unavailable or operate in an unexpected manner. The fault may be specified according to a testing condition provided by a testing conditions controller (such as testing condition(s) controller 222 of FIG. 2). In particular and as described at block 330, the computer application may be subjected to one or more testing conditions, such as the first fault, which may be specified by a testing conditions controller and introduced into the computer system operation by a testing engine, (such as testing engine 224 of FIG. 2) or an experimentation platform. In some embodiments of block 340, a first fault that is a failure incident is introduced into the computer system and causes an error in the operation of the computer application. In some embodiments, the first fault is determined based on chaos testing. For example, an embodiment of testing engine 224 comprises a chaos testing engine, such as described in connection with FIG. 2. Some embodiments of block 340 may be carried out using testing condition(s) controller 222 and/or testing engine 224 (FIG. 2). Additional details of embodiments of block 340, or for carrying out operations of block 340, are described in connection to FIG. 2, and in particular testing condition(s) controller 222 and testing engine 224.

At block 350, method 300 includes monitoring the computer system during the operation to determine a second-condition telemetry data set. Embodiments of block 350 monitor the computer system for the second session of time, within which the computer application operates according to the second condition, to determine a second-condition telemetry data set. For example, telemetry data regarding the computer system may be captured (e.g., by one or more telemetry data recorders, such as telemetry data recorder 226 of FIG. 2) over the second session of time. The second-condition telemetry data set that is determined at block 350 may be considered fault state telemetry data, such as described in connection to FIG. 2, due to the first fault that is caused at block 340. Accordingly, the second-condition telemetry data determined at block 350 may include telemetry data that is associated with the first fault, such as telemetry data that reflects a response by the computer system and/or computer application to the first fault. Some embodiments of block 350 are carried out using telemetry data recorder 226 (FIG. 2). Additional details of embodiments of block 350, or for carrying out operations of block 350, are described in connection to FIG. 2, and in particular telemetry data recorder 226.

Some embodiments of blocks 340 and 350 are repeated for multiple sessions wherein, for each session, the computer application is operated on the computer system according the second-condition and the first fault is caused during the session. In these embodiments, for each of the multiple sessions, a second-condition telemetry data set is captured thereby forming a plurality of second-condition telemetry data sets, and from which a composite second-condition telemetry data is determined as the second-condition telemetry data set. For example, in some embodiments, telemetry data values for each of the second-condition telemetry data sets are averaged, or another statistical operation is performed, to determine a composite telemetry data value to be included in a resulting, composite first-condition telemetry data set. Alternatively or in addition, in some embodiments, a comparison operation (such as described in connection with telemetry data recorder 226 and telemetry data comparison logic 290 of FIG. 2) is performed among the plurality of second-condition telemetry data sets. Based on the comparison, a composite second-condition telemetry data set is determined that includes a set of telemetry data that is present in each of the second-condition telemetry data sets of the plurality or a set of similar telemetry data that is present in each of the second-condition telemetry data sets of the plurality. For example, similar telemetry data occurring in each of the second-condition telemetry data sets, (such as telemetry data having similar features and/or feature values, and which may be determine d to be similar by utilizing a similarity threshold) is used to generate a composite second-condition telemetry data set. Further, some embodiments of this composite second-condition telemetry data set includes only telemetry data that is present in each of the second-condition telemetry data sets of the plurality and excludes any telemetry data that is not present in each of the second-condition telemetry data sets of the plurality.

At block 360, method 300 includes determining a fault feature based on a comparison of the first-condition telemetry data set and the second-condition telemetry data set. The fault feature may comprise a data aspect included in the second-condition telemetry data set that is not included in the first-condition telemetry data set. Some embodiments of block 360 comprise determining a plurality of fault features. In particular, embodiments of block 360 may programmatically determine at least one data aspect included in the second-condition telemetry data set that is not included in the first-condition telemetry data set, based on a comparison of the first-condition telemetry data set and the second-condition telemetry data set. For example, a particular telemetry data feature and/or data feature value that is determined to be present in the second-condition telemetry data set but not present in the first-condition telemetry data set may be determined as a fault feature. In some embodiments, the particular telemetry data feature and/or data feature value that is determined to be a fault feature is sufficiently different than a telemetry data feature and/or data feature value so as to function as an indication of the first fault that is associated with the second-condition telemetry data set. Some embodiments of block 360 utilize telemetry data comparison logic 290 to perform the comparison and/or to determine the fault feature, as described in connection to FIG. 2. Some embodiments of block 360 utilize a one class support vector machine (SVM) for determining the fault feature. Some embodiments of block 360 are carried out using fault profile generator 250, and/or using telemetry data comparer 252 and fault features determiner 254 (FIG. 2). Additional details of embodiments of block 360, or for carrying out operations of block 360, are described in connection to FIG. 2, and in particular fault profile generator 250, telemetry data comparer 252, and fault features determiner 254.

At block 370, method 300 includes generating a first fault profile that is a data structure that comprises an indication of the first fault and an indication of the fault feature. Embodiments of block 370 generate a fault profile, such as described in connection to fault profile generator 250 of FIG. 2, that includes an indication of the first fault that is caused at block 340 and an indication of the fault feature (or fault features for embodiments that determine a plurality of fault features) determined at block 360. In some embodiments of block 370, the fault profile further includes an indication of the computer application and/or the fault profile is associated with the computer application. For example, as described herein, some embodiments of a fault profile include information regarding an application ID or application version information. In some embodiments of block 370, the fault profile further comprises logic or computer-executable instructions, such as described in connection to fault profile generator 250 and diagnostic service 270 (FIG. 2) to facilitate the detection of the fault feature or determining that the first fault is a root cause fault, and/or to mitigate the first fault that is a root cause fault. Some embodiments of block 370 are carried out using fault profile generator 250, and/or using fault profile assembler 256 (FIG. 2). Additional details of embodiments of block 370, or for carrying out operations of block 370, are described in connection to FIG. 2, and in particular fault profile generator 250 and fault profile assembler 256.

Some embodiments of method 300 may be repeated to generate additional fault profiles based on other, different faults. In this way, a set of fault profiles associated with the computer application are generated. Further, some embodiments of method 300 comprise utilizing at least one of the fault profiles to determine a root cause of an error that is detected in connection with the operation of the computer application.

With reference to FIG. 4, aspects of example process flow 400 are illustratively depicted for determining a root cause of an error associated with a computer application based on using a fault profile. In particular, example process flow 400 may be performed to determine the root cause of an error associated with the operation of a computer application by using a set of fault profiles, such as described in connection with FIG. 2. At block 410, method 400 includes detecting an error during the operation of a computer application on a computer system. In some embodiments, the error comprises an unexpected event associate with the operation of the computer application, and may be detected during or subsequent to the operation of the computer application on the computer system. Some embodiments of block 410 detect an error using an error detector or error handling computer service, such as error detector 262 described in connection to FIG. 2. Some embodiments of block 410 are carried out using error detector 262 (FIG. 2). Additional details of embodiments of block 410, or for carrying out operations of block 410, are described in connection to FIG. 2, and in particular error detector 262.

At block 420, method 400 includes determining a first telemetry data set for a time frame that includes the occurrence of the error. Embodiments of block 420 determine a first telemetry data set that comprises telemetry data of the computer system. The telemetry data is captured during a time frame that includes the occurrence of the error. In some embodiments, the telemetry data is captured after the occurrence of the error. In some embodiments, the captured telemetry data includes telemetry data from before, during, and/or after the error. Some embodiments of block 420 are carried out using telemetry data recorder 264 (FIG. 2). Additional details of embodiments of block 420, or for carrying out operations of block 420, are described in connection to FIG. 2, and in particular telemetry data recorder 264.

At block 430, method 400 includes determining a relevant fault profile. Embodiments of block 430 determine a relevant fault profile that is relevant to the first telemetry data set. As the first telemetry data set may include telemetry data that is associated with the error detected at block 410, the relevant fault profile determined at block 430 may be considered relevant to the detected error. Some embodiments of block 430 determine a relevant fault profile as described in connection to relevant fault profile determiner 272 in FIG. 2.

According to method 400, determining a relevant fault profile at block 430 comprises the following operations. At block 432, a set of one or more fault profiles is accessed. The fault profiles may be associated with the computer application operating on the computer system. In some embodiments, each fault profile in the set includes at least an indication of a fault. For example, each fault profile may include an indication of a failure incident, such as described in connection to fault profile generator 250 and relevant fault profile determiner 272 in FIG. 2. In some embodiments, block 432 further includes performing an operation to determine the set of fault profiles based on the computer application.

At block 434, for each fault profile in the set of fault profiles, a comparison operation is performed on the first telemetry data set and the fault profile. Embodiments of block 434 perform a comparison operation, comparing the first telemetry data set against each fault profile in the set of fault profiles, thereby forming a set of comparison operations. In some embodiments of block 434, each comparison operation comprises a similarity comparison and provides an indication of similarity, such as a similarity score, for the first set of telemetry data and the fault profile of the comparison. For example and as described in connection to telemetry data comparison logic 290 (FIG. 2), the similarity comparison may comprise a data-feature similarity comparison or determining differences in data feature vectors of the first telemetry data and the fault profile. Based on the similarity indications from the comparisons, the fault profile of the comparison having a highest similarity indication (such as the highest similarity score) is determined as the relevant fault profile.

In some embodiments of block 434, each comparison operation comprises a classification operation. For example, as described in connection to relevant fault determiner 272 (FIG. 2), a classification model may be utilized wherein the model receives as input an aspect of the first set of telemetry data. For example, in one embodiment the classification model comprises an artificial neural network (ANN) that is trained on fault features of fault profiles that correspond to different faults. Aspects of the first set of telemetry data, such as one or more telemetry data features, are provided as input to the classification model, which then classifies the input telemetry data features of the first set of telemetry data as being similar to a particular fault profile. That particular fault profile classified by the ANN (or classification model) may be determined at block 436 as the relevant fault profile.

At block 436 of method 400, based on the set of comparison operations the relevant fault profile is determined from the set of fault profiles. Embodiments of block 436 determine the relevant fault profile from the set of fault profiles that was accessed at block 432, based on the comparison operations performed at block 434. For example, in some embodiments where the comparison operations comprise similarity comparisons, the relevant fault profile is determined as the most similar fault profile, such as the fault profile having the highest similarity score. Some embodiments of block 430 or blocks 432, 434, and 436 are carried out using diagnostic service 270, and/or using relevant fault determiner 272 (FIG. 2). Additional details of embodiments of block 430 and blocks 432, 434, and 436, or for carrying out operations of block 430 or blocks 432, 434, and 436, are described in connection to FIG. 2, and in particular diagnostic service 270 and relevant fault determiner 272.

At block 440, method 400 includes determining a root cause of the error, based on the relevant fault profile. Embodiments of block 440 may determine a root cause of the error that is detected in block 410, based on the relevant fault profile determined at block 430. In some embodiments, the root cause of the error determined at block 440 is based on the indication of the fault in the relevant fault profile. For example, in some instances, the failure indicated in the relevant fault profile is determined at block 440 as the root cause of the error. In some embodiments, the fault profile further includes instructions for performing diagnostic testing (such as described in connection to root cause fault determiner 274 in FIG. 2) to confirm that the fault profile indicated by the relevant fault profile is a root cause of the error. Some embodiments of block 440 are carried out using root cause fault determiner 274 (FIG. 2). Additional details of embodiments of block 440, or for carrying out operations of block 440, are described in connection to FIG. 2, and in particular root cause fault determiner 274.

At block 450, method 400 includes providing an indication of the root cause of the error. Embodiments of block 450 provide an indication of the root cause of the error that is determined in block 440. In some embodiments of block 450, the indication of the root cause of the error is provided with an indication of the error detected at block 410. In some embodiments, the indication comprises an electronic notification that is provided to a user such as an end user of the computer application, a system administrator, or a developer of the computer application. In some embodiments, the indication comprises modifying a system event log for the computer system to include supplemental information regarding the root cause of the error. For example, a system event log entry for the detected error may be annotated to further include an indication of the root cause of the error.

Some embodiments of method 400 further comprise performing a mitigation operation corresponding to the root cause of the error. For example, some embodiments of a fault profile further include logic or computer-executable instructions (such as described in connection to fault profile generator 250 and diagnostic service 270 in FIG. 2), to mitigate the fault that is the root cause of the error and/or the detected error. Alternatively or in addition, some embodiments of method 400 utilize diagnostic logic 295 (FIG. 2), which may include a set of mitigation operations that correspond to particular root cause faults and/or detected errors and may be utilize d for mitigating those root cause faults and/or detected errors. Accordingly, based on the root cause fault, the error, and/or the fault profile, some embodiments of method 400 further comprise determining and performing a mitigation operation to mitigate the root cause of the error and/or the error. Some embodiments of method 400 further comprise determining a mitigation operation, such as described previously, and providing an indication of the mitigation operation with an indication of the root cause of the error.

Accordingly, various aspects of improved technologies for diagnosing and mitigating errors in computer applications are described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and, in fact, the steps may occur in a variety of different sequences within embodiments hereof Such variations and combinations thereof are also contemplated to be within the scope of embodiments of this disclosure.

Other Embodiments

In some embodiments, a computerized system is provided for determining a root cause of an error associated with a computer application, such as the computerized (or computer or computing) system described in any of the embodiments above. The computerized system comprises at least one processor, and computer memory having computer-readable instructions embodied thereon, that, when executed by the at least one processor, perform operations. The operations comprise operating a subject computer application on a first computer system according to a first condition of operation, the subject computer application operating within a first time frame that is a first-condition session. The operations further comprise monitoring the first computer system during the first-condition session to determine a first-condition telemetry data set. The operations further comprise operating the subject computer application on the first computer system according to a second condition of operation, the subject computer application operating within a second time frame that is a second-condition session. The operations further comprise, during the second-condition session, causing a first fault associated with the operation of the subject computer application during the second-condition session. The operations further comprise monitoring the first computer system during the second-condition session to determine a second-condition telemetry data set. The operations further comprise, based on a comparison of the first-condition telemetry data set and the second-condition telemetry data set, programmatically determining a data aspect included in the second-condition telemetry data set that is not included in the first-condition telemetry data set. The operations further comprise generating a first fault profile that is a data structure that comprises at least an indication of the first fault and the data aspect included in the second-condition telemetry data set.

In any combination of the above embodiments of the system, the first condition of operation comprises a condition wherein the subject computer operates without an error during the first-condition session.

In any combination of the above embodiments of the system, the first computer system comprises at least one computer resource that supports the operation of the subject computer application, and wherein causing the first fault comprises configuring the at least one computer resource to cause an error in the operation of the subject computer application.

In any combination of the above embodiments of the system, the first computer system operates the subject computer application in an evaluation environment on an experimentation platform, and wherein the first fault is determined based on chaos testing.

In any combination of the above embodiments of the system, monitoring the first computer system to determine a first-condition telemetry data set comprises capturing telemetry data regarding the subject computer application or the first computer system during the first-condition session.

In any combination of the above embodiments of the system, the operations further comprise operating the subject computer application on the first computer system according to the first condition of operation for a plurality of additional first-condition sessions. The operations further comprise monitoring each of the plurality of first-condition sessions to determine a plurality of additional first-condition telemetry data sets. The operations further comprise performing a comparison operation on the plurality of additional first-condition telemetry data sets and the first-condition telemetry data set to determine a set of common aspects of telemetry data that are present in each of the additional first-condition telemetry data sets and the first-condition telemetry data set. The operations further comprise updating the first-condition telemetry data set to include the set of common aspects of telemetry data. The operations further comprise utilizing the updated first-condition telemetry data set for the comparison with the second-condition telemetry data set.

In any combination of the above embodiments of the system, the comparison of the first-condition telemetry data set and the second-condition telemetry data set comprises one of a data feature similarity comparison operation or using a one class support vector machine (SVM).

In any combination of the above embodiments of the system, the first fault profile further comprises an indication of the subject computer application.

In any combination of the above embodiments of the system, the first fault profile further comprises a mitigation operation for mitigating the first fault.

In any combination of the above embodiments of the system, the operations further comprise utilizing the first fault profile to determine a root cause of an error that is detected in connection with the subject computer application operating on a second computer system.

In some embodiments, a computerized system is provided for determining a root cause of an error associated with a computer application, such as the computerized (or computer or computing) system described in any of the embodiments above. The computerized system comprises at least one processor, and computer memory having computer-readable instructions embodied thereon, that, when executed by the at least one processor, perform operations. The operations comprise detecting an error during an operation of a subject computer application on a computer system. The operations further comprise determining a first telemetry data set comprising telemetry data of the computer system for a time frame that includes an occurrence of the error. The operations further comprise determining a first relevant fault profile by accessing a plurality of fault profiles, each fault profile in the plurality of fault profiles including at least an indication of a fault that is different than the faults indicated by other fault profiles of the plurality; for each fault profile in the plurality of fault profiles, perform a comparison operation of the first telemetry data set and the fault profile, thereby performing a plurality of comparison operations; and based on the plurality of comparison operations, determining the first relevant fault profile from the plurality of fault profiles. The operations further comprise, based on the first relevant fault profile, determining a root cause of the error. The operations further comprise providing an indication of the root cause of the error.

In any combination of the above embodiments of the system, the error is detected during the operation of the subject computer application and the error comprises an unexpected outcome associated with the operation of the subject computer application.

In any combination of the above embodiments of the system, the plurality of fault profiles is associated with the subject computer application; and further comprise determining the plurality of fault profiles based on the subject computer application.

In any combination of the above embodiments of the system, each comparison operation of the plurality of comparison operations comprises a similarity comparison that provides an indication of similarity between the first telemetry data set and the fault profile, thereby providing a plurality of similarity indications.

In any combination of the above embodiments of the system, the first relevant fault profile is determined as the fault profile having the highest similarity indicated by plurality of similarity indications.

In any combination of the above embodiments of the system, each comparison operation of the plurality of comparison operations comprises a classification operation using a classification model that receives as input at least a portion of the first set of telemetry data.

In any combination of the above embodiments of the system, the root cause of the error is determined based on the indication of the fault in the first relevant fault profile.

In any combination of the above embodiments of the system, the indication of the root cause of the error is provided with an indication of the detected error.

In any combination of the above embodiments of the system, each fault profile in the plurality of fault profiles further includes a mitigation operation corresponding to the indicated fault.

In any combination of the above embodiments of the system, the operations further comprise receiving the mitigation operation included in the relevant fault profile (the relevant fault profile mitigation operation).

In any combination of the above embodiments of the system, the operations further comprise performing the relevant fault profile mitigation operation to mitigate the root cause of the error.

In any combination of the above embodiments of the system, the operations further comprise providing an indication of the relevant fault profile mitigation operation with the indication of the root cause of the error.

In some embodiments, a computer-implemented method is provided for determining a root cause of an error associated with a computer application. The method comprises operating a subject computer application on a first computer system according to a first condition of operation, the subject computer application operating within a first time frame that is a first-condition session. The method further comprises monitoring the first computer system during the first-condition session to determine a first-condition telemetry data set. The method further comprises operating the subject computer application on the first computer system according to a second condition of operation, the subject computer application operating within a second time frame that is a second-condition session. The method further comprises during the second-condition session, causing a fault associated with the operation of the subject computer application during the second-condition session. The method further comprises monitoring the first computer system during the second-condition session to determine a second-condition telemetry data set. The method further comprises, based on a comparison of the first-condition telemetry data set and the second-condition telemetry data set, programmatically determining a data aspect included in the second-condition telemetry data set that is not included in the first-condition telemetry data set. The method further comprises generating a fault profile that is a data structure that comprises at least an indication of the fault and the data aspect included in the second-condition telemetry data set. The method further comprises, based on an indication that an error is detected in connection with the subject computer application, providing the fault profile for use to determine a root cause of the error.

In any combination of the above embodiments of the method, the first computer system comprises at least one computer resource that supports the operation of the subject computer application.

In any combination of the above embodiments of the method, causing the fault comprises configuring at least one computer resource to cause an induced error in the operation of the subject computer application.

In any combination of the above embodiments of the method, the comparison of the first-condition telemetry data set and the second-condition telemetry data set comprises a data feature similarity comparison operation.

In any combination of the above embodiments of the method, the fault profile further comprises an indication of the subject computer application and a mitigation operation for mitigating the first fault.

Example Computing Environments

Figure 5:
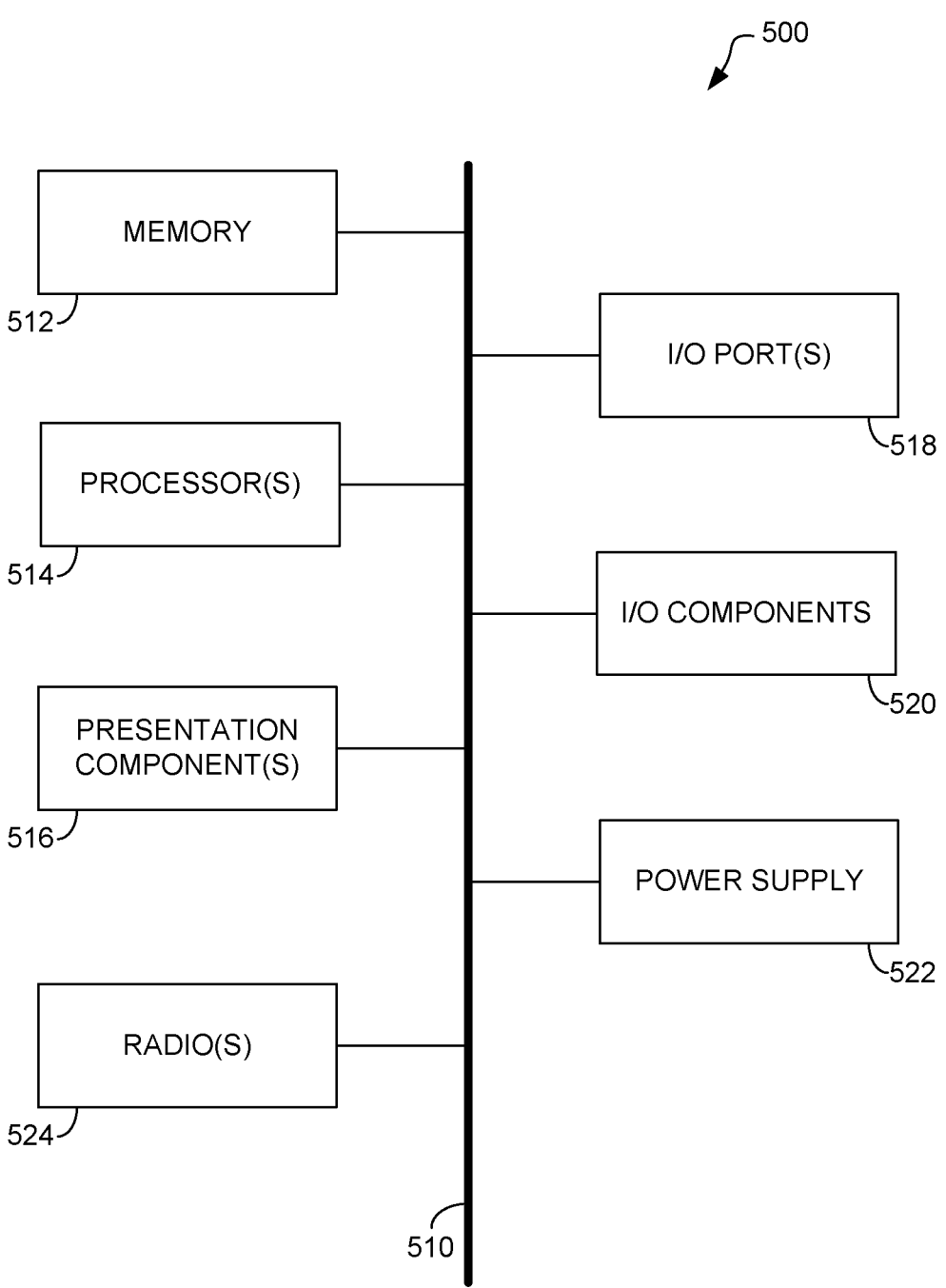
FIG. 5 is a block diagram of an example computing environment suitable for use in implementing an embodiment of the present disclosure.
Figure 6:
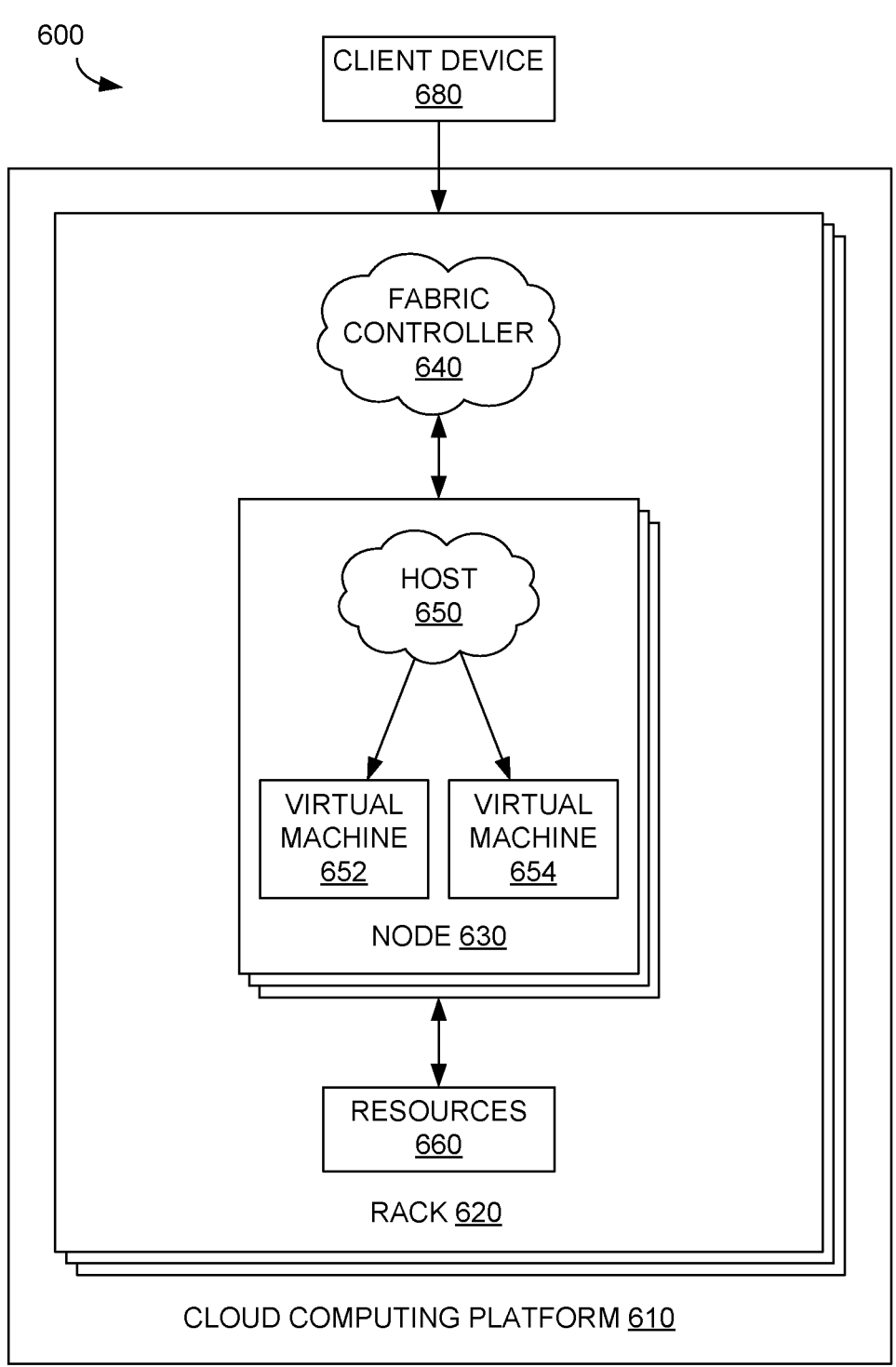
FIG. 6 is a block diagram of an example computing environment suitable for use in implementing an embodiment of the present disclosure.

Having described various implementations, several example computing environments suitable for implementing embodiments of the disclosure are now described, including an example computing device and an example distributed computing environment in FIGS. 5 and 6, respectively. With reference to FIG. 5, an example computing device is provided and referred to generally as computing device 500.

The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating to, for example, logic, control, and memory operations. Low level software written in machine code can provide more complex functionality to higher levels of software. Accordingly, in some embodiments, computer-executable instructions may include any software, including low level software written in machine code, higher level software, such as application software, and any combination thereof. In this regard, the system components can manage system resources and provide services for system functionality. Any other variations and combinations thereof are contemplated with embodiments of the present disclosure.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more buses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an example computing device that can be used in connection with one or more embodiments of the present disclosure. Distinction is not made between such categories as "workstation," "server," "laptop," or "handheld device," as all are contemplated within the scope of FIG. 5 and with reference to "computing device."

Computing device 500 typically includes or uses a variety of computer-readable media. Computer-readable media can be any available media that can be accessed by computing device 500 and includes both volatile and nonvolatile, removable and non-removable media. By way of example, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes random access memory (RAM), read only memory (ROM), electrically erasable programmable read-only memory (EEPROM), flash memory or other memory technology, CD-ROM, digital versatile disks (DVDs) or other optical disk storage, magnetic cassettes, magnetic tape, magnetic disk storage or other magnetic storage devices, or any other hardware medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner so as to encode information in the signal. By way of example, communication media includes wired media, such as a wired network or direct-wired connection, and wireless media, such as acoustic, radio frequency (RF), infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Example hardware devices include, for example, solid-state memory, hard drives, and optical-disc drives. Computing device 500 includes one or more processors 514 that read data from various entities such as memory 512 or I/O components 520. As used herein, the term processor or "a processer" may refer to more than one computer processor. For example, the term processor (or "a processor") may refer to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 516 present data indications to a user or other device. Example presentation components include a display device, speaker, printing component, vibrating component, and the like. The I/O ports 518 allow computing device 500 to be logically coupled to other devices, including I/O components 520, some of which may be built in. Illustrative components include a keyboard, touch screen or touch-sensitive surface, microphone, camera, mouse, joystick, game pad, satellite dish, scanner, printer, or a wireless peripheral device. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio transmits and receives radio or wireless communications. The computing device 500 may be a wireless terminal adapted to receive communications and media over various wireless networks. Computing device 500 may communicate via wireless protocols, such as code division multiple access (CDMA), global system for mobiles (GSM), or time division multiple access (TDMA), as well as other wireless protocols, to communicate with other devices. The radio communications may be a short-range connection, a long-range connection, or a combination of both a short-range and a long-range wireless telecommunications connection. Short-range and long-range types of connections do not refer to the spatial relation between two devices, but instead refers to short range and long range as different categories, or types, of connections (for example, a primary connection and a secondary connection). A short-range connection may include, by way of example, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example, one or more of CDMA, General Packet Radio Service (GPRS), GSM, TDMA, and 802.16 protocols, or other long-range communication protocols used by mobile devices.

Referring now to FIG. 6, an example distributed computing environment 600 is illustratively provided, in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support a distributed computing environment 600 that includes a cloud computing platform 610, a rack 620, and a node 630 (e.g., computing devices, processing units, or blades) in rack 620. The technical solution environment can be implemented with cloud computing platform 610, which runs cloud services, such as cloud computing applications, across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing platform 610 in a data center can be configured to host and support operation of endpoints of a particular service. Cloud computing platform 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. A cloud service may comprise any software, or portions of software, that run on top of, or access storage and computing device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (such as computer resources, which may comprise hardware resources and/or software resources) in cloud computing platform 610. It is contemplated that resources 660 can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device, referred to as a cluster. Each server in the cluster can be implemented as a node.

Client device 680 may be linked to a service application in cloud computing platform 610. Client device 680 may be any type of computing device, such as user device 102*n* described with reference to FIG. 1, and the client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include one or more LANs and/or WANs.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of aspects of the present disclosure is described with specificity herein to meet statutory requirements. However, the description itself is not intended to limit the scope of this patent. Rather, it is contemplated that the claimed subject matter might also be embodied in other ways, such as to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

For purposes of this disclosure, the word "including" has the same broad meaning as the word "comprising," and the word "accessing" comprises "receiving," "referencing," or "retrieving." Furthermore, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, the term "set" may be employed to refer to an ordered (i.e., sequential) or an unordered (i.e., nonsequential) collection of objects (or elements), such as machines (e.g., computer devices), physical and/or logical addresses, graph nodes, graph edges, functionalities, and the like. As used herein, a set may include N elements where N is any positive integer. That is, a set may include 1, 2, 3, . . . N objects and/or elements, where N is a positive integer with no upper bound. Therefore, as used herein, a set does not include a null set (i.e., an empty set), that includes no elements (e.g., N=0 for the null set). A set may include only a single element. In other embodiments, a set may include a number of elements that is significantly greater than one, two, three, or billions of elements. A set may be an infinite set or a finite set. The objects included in some sets may be discrete objects (e.g., the set of natural numbers N). The objects included in other sets may be continuous objects (e.g., the set of real numbers R). In some embodiments, "a set of objects" that is not a null set of the objects may be interchangeably referred to as either "one or more objects" or "at least one object," where the term "object" may stand for any object or element that may be included in a set. Accordingly, the phrases, "one or more objects" and "at least one object" may be employed interchangeably to refer to a set of objects that is not the null or empty set of objects. A set of objects that includes at least two of the objects may be referred to as "a plurality of objects."

As used herein, the term "subset," is a set that is included in another set. A subset may be, but is not required to be, a proper or strict subset of the other set that the subset is included within. That is, if set B is a subset of set A, then in some embodiments, set B is a proper or strict subset of set A. In other embodiments, set B is a subset of set A, but not a proper or a strict subset of set A. For example, set A and set B may be equal sets, and set B may be referred to as a subset of set A. In such embodiments, set A may also be referred to as a subset of set B. Two sets may be disjointed sets if the intersection between the two sets is the null set.

As used herein, the terms "source code" and "code" may be used interchangeably to refer human-readable instructions that at least partially enable the execution of a computer application. Source code may be encoded in one or more programming languages, e.g., Fortran, C, C++, Python, Ruby, *Julia*, R, Octave, Java, JavaScript, and the like. In some embodiments, prior to enabling an execution of a computer application, source code may be subjected to a compilation and/or linking process. As used herein, the term "executable" may refer to any set of machine instructions that instantiate a copy of a computer application and enable the one or more computing machines (e.g., a physical or virtual machine) to execute, run, or otherwise implement the instantiated application. A computer application may include a set of executables. An executable may be a binary executable, e.g., a set of executable machine instructions generated via the compilation of human-readable source code (in a programming language) and linking of the binary objects generated via the compilation. That is, an executable for a computer application may be generated via compiling the source code for the computer application. Although the embodiments are not so limited, a computer application may include human-readable source code, e.g., applications generated via interpreted programming languages. For instance, an executable for the computer application may include the source code for the computer application. An executable may include one or more binary executables, one or more source code-based executables, or any combination thereof. An executable may include and be dependent upon one or more libraries of functions, objects, or the like. An executable may be encoded in a single file, or the encoding may be distributed across multiple files. That is, an encoding of an executable may be distributed across a plurality of files. The encoding may include one or more data files, where the execution of the computer application may be dependent upon reading and/or writing to the one or more data files.

For purposes of a detailed discussion above, embodiments of the present invention are described with reference to a computing device or a distributed computing environment;

however the computing device and distributed computing environment depicted herein is merely illustrative. Moreover, the terms computer system and computing system may be used interchangeably herein, such that a computer system is not limited to a single computing device, nor does a computing system require a plurality of computing devices. Rather, various aspects of the embodiments of this disclosure may be carried out on a single computing device or a plurality of computing devices, as described herein. Additionally, components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Many different arrangements of the various components depicted, as well as components not shown, are possible without departing from the scope of the claims below. Embodiments of the present disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A system for determining a root cause of an error associated with a computer application, the system comprising:

a processor; and computer memory having computer-readable instructions embodied thereon, that, when executed by the processor, perform operations comprising:

operating a subject computer application on a first computer system including a plurality of computer resources according to a first condition of operation, the subject computer application operating within a first time frame that is a first-condition session;

monitoring the first computer system during the first-condition session to determine a first-condition telemetry data set;

operating the subject computer application on the first computer system according to a second condition of operation, the subject computer application operating within a plurality of second time frames that are a plurality of second-condition sessions;

during each of the plurality of second-condition sessions, causing a first fault associated with the operation of the subject computer application within the second-condition session, the first fault including a failure originating in a dependent computer resource of the plurality of computer resources upon which the subject computer application depends;

monitoring the first computer system during each of the plurality of second-condition sessions to determine a plurality of second-condition telemetry data sets;

generating a composite second-condition telemetry data set based on the plurality of second-condition telemetry data sets, the composite second-condition telemetry data set exclusively including data that is similar across the second-condition data sets as determined using a similarity threshold;

programmatically determining a data aspect included in the composite second- condition telemetry data set that is not included in the first-condition telemetry data set by comparing the first-condition telemetry data set and the composite second-condition telemetry data set; and generating a first fault profile comprising a data structure including at least an indication of the first fault and the data aspect, the indication of the first fault indicating the dependent computer resource of the subject computer application.

2. The system of claim 1, wherein the first condition of operation comprises the subject computer application operating without an error during the first-condition session.

3. The system of claim 1, wherein the computer resource supports the operation of the subject computer application, and wherein causing the first fault comprises configuring the computer resource to cause an error in the operation of the subject computer application.

4. The system of claim 1, wherein the first computer system operates the subject computer application in an evaluation environment on an experimentation platform, and wherein the first fault is determined based on chaos testing.

5. The system of claim 1, wherein monitoring the first computer system to determine the first-condition telemetry data set comprises capturing telemetry data regarding the subject computer application or the first computer system during the first-condition session.

6. The system of claim 1 the operations further comprising:

operating the subject computer application on the first computer system according to the first condition of operation for a plurality of additional first-condition sessions;

monitoring each of the plurality of first-condition sessions to determine a plurality of additional first-condition telemetry data sets;

performing a comparison operation on the plurality of additional first-condition telemetry data sets and the first-condition telemetry data set to determine a set of common aspects of telemetry data that are present in each of the additional first-condition telemetry data sets and the first-condition telemetry data set;

updating the first-condition telemetry data set to include the set of common aspects of telemetry data; and utilizing the updated first-condition telemetry data set for the comparison with the composite second-condition telemetry data set.

7. The system of claim 1, wherein the comparison of the first-condition telemetry data set and the composite second-condition telemetry data set comprises one of a data feature similarity comparison operation or using a one class support vector machine (SVM).

8. The system of claim 1, wherein the first fault profile further comprises an indication of the subject computer application.

9. The system of claim 1, wherein the first fault profile further comprises a mitigation operation for mitigating the first fault.

10. The system of claim 1, wherein the operations further comprise utilizing the first fault profile to determine a root cause of an error that is detected in connection with the subject computer application operating on a second computer system.

11. A computer system for determining a root cause of an error associated with a computer application, the system comprising:

a processor; and computer memory having computer-readable instructions embodied thereon, that, when executed by the processor, perform operations comprising:

detecting an error during an operation of a subject computer application on the computer system;

determining a first telemetry data set comprising telemetry data of the computer system for a time frame that includes an occurrence of the error;

accessing a plurality of fault profiles associated with different dependent resources of the subject computer application, each fault profile in the plurality of fault profiles corresponding to a discrete computing resource of the different dependent resources and modeling a telemetry pattern observed in association with a fault originating at the discrete computing resource, the discrete computing resource being a virtual or physical machine or memory;

for each fault profile in the plurality of fault profiles, performing a comparison operation of the first telemetry data set and the fault profile, thereby performing a plurality of comparison operations;

based on a determined similarity between the first telemetry set and a particular fault profile of the plurality of fault profiles:

selecting the particular fault profile as a first relevant fault profile; and identifying the corresponding discrete resource associated with the first relevant fault profile as the root cause of the error; and providing an indication of the root cause of the error.

12. The system of claim 11, wherein the error is detected during the operation of the subject computer application and the error comprises an unexpected outcome associated with the operation of the subject computer application.

13. The system of claim 11, wherein the plurality of fault profiles are associated with the subject computer application; and further comprising determine the plurality of fault profiles based on the subject computer application.

14. The system of claim 11:

wherein each comparison operation of the plurality of comparison operations comprises a similarity comparison that provides an indication of similarity between the first telemetry data set and the fault profile, thereby providing a plurality of similarity indications; and wherein the first relevant fault profile is determined as the fault profile having a greatest similarity indicated by plurality of similarity indications.

15. The system of claim 11, wherein each comparison operation of the plurality of comparison operations comprises a classification operation using a classification model that receives as input at least a portion of the first set of telemetry data.

16. The system of claim 11, wherein the root cause of the error is determined based on the indication of the fault in the first relevant fault profile.

17. The system of claim 11, wherein the indication of the root cause of the error is provided with an indication of the detected error.

18. The system of claim 11, wherein each fault profile in the plurality of fault profiles further includes a mitigation operation corresponding to the indicated fault; and the operations further comprising:

receiving the mitigation operation included in the relevant fault profile (the relevant fault profile mitigation operation); and performing the relevant fault profile mitigation operation to mitigate the root cause of the error; or providing an indication of the relevant fault profile mitigation operation with the indication of the root cause of the error.

19. A computer-implemented method for determining a root cause of an error associated with a subject computer application, the method comprising:

operating the subject computer application on a first computer system including a plurality of computer resources according to a first condition of operation, the subject computer application operating within a first time frame that is a first-condition session;

determining a first-condition telemetry data set by monitoring the first computer system during the first-condition session;

operating the subject computer application on the first computer system according to a second condition of operation, the subject computer application operating within a plurality of second time frames that are a plurality of second-condition sessions;

during each of the plurality of second-condition sessions, causing a fault associated with the operation of the subject computer application during the second-condition session, the fault including a failure of a computer resource of the plurality of computer resources of the first computer system or a failure of a component of the subject computer application;

determining a plurality of second-condition telemetry data sets by monitoring the first computer system during the plurality of second-condition sessions;

generating a composite second-condition telemetry data set based on the plurality of second-condition telemetry data sets, the composite second-condition telemetry data set exclusively including data that is similar across the second-condition data sets as determined using a similarity threshold;

based on a comparison of the first-condition telemetry data set and the composite second-condition telemetry data set, programmatically determining a data aspect included in the composite second-condition telemetry data set that is not included in the first-condition telemetry data set;

generating a fault profile comprising a data structure including at least an indication of the fault and the data aspect, the indication of the fault indicating the computer resource or the component of the subject computer application; and based on an indication that an error is detected in connection with the subject computer application, providing the fault profile.

20. The computer-implemented method of claim 19:

wherein the first computer system includes a computer resource that supports the operation of the subject computer application, and wherein causing the fault comprises configuring the computer resource to cause an induced error in the operation of the subject computer application;

wherein the comparison of the first-condition telemetry data set and the composite second-condition telemetry data set comprises a data feature similarity comparison operation; and wherein the fault profile further comprises an indication of the subject computer application and a mitigation operation for mitigating the first fault.

* * * * *